(12) United States Patent
Gao et al.

(10) Patent No.: US 12,005,593 B2
(45) Date of Patent: Jun. 11, 2024

(54) MICROFLUIDIC VALVES AND CHANNELS AND MINIFLUIDIC VALVES AND CHANNELS ENABLED SOFT ROBOTIC DEVICE, APPAREL, AND METHOD

(71) Applicants: Run Ze Gao, Kitchener (CA); Carolyn L. Ren, Waterloo (CA); Clark R. Dickerson, Kitchener (CA); Jacqueline Mary Kormylo, Kanata (CA); Peter S. Lee, Waterloo (CA); Vivian Ngoc Tram Mai, Mississauga (CA)

(72) Inventors: Run Ze Gao, Kitchener (CA); Carolyn L. Ren, Waterloo (CA); Clark R. Dickerson, Kitchener (CA); Jacqueline Mary Kormylo, Kanata (CA); Peter S. Lee, Waterloo (CA); Vivian Ngoc Tram Mai, Mississauga (CA)

( * ) Notice: Subject to any disclaimer, the term of this patent is extended or adjusted under 35 U.S.C. 154(b) by 0 days.

(21) Appl. No.: 18/282,587

(22) PCT Filed: Nov. 14, 2022

(86) PCT No.: PCT/CA2022/051677
§ 371 (c)(1),
(2) Date: Sep. 18, 2023

(87) PCT Pub. No.: WO2023/082019
PCT Pub. Date: May 19, 2023

(65) Prior Publication Data
US 2024/0033939 A1    Feb. 1, 2024

Related U.S. Application Data

(60) Provisional application No. 63/279,105, filed on Nov. 13, 2021.

(51) Int. Cl.
*B25J 9/20*    (2006.01)
*F15C 3/04*    (2006.01)
(Continued)

(52) U.S. Cl.
CPC ............... *B25J 9/20* (2013.01); *F15C 3/04* (2013.01); *F15C 5/00* (2013.01); *F16K 7/07* (2013.01);
(Continued)

(58) Field of Classification Search
CPC ...... B25J 9/20; F15C 3/04; F15C 5/00; F16K 99/0015; F16K 99/0055; F16K 2099/008; F16K 7/07; F16K 7/04
(Continued)

(56) References Cited

U.S. PATENT DOCUMENTS 7,766,033 B2 * 8/2010 Mathies .............. F16K 99/0015
251/26
7,892,496 B2 * 2/2011 McAvoy ............... F04B 43/043
251/11

(Continued)

FOREIGN PATENT DOCUMENTS

WO    2015102723 A2    7/2015
WO    2020/257925       12/2020

OTHER PUBLICATIONS

Search Report & Written Opinion issued in PCT/CA2022/051677 (dated Feb. 15, 2023).
(Continued)

*Primary Examiner* — John Bastianelli
(74) *Attorney, Agent, or Firm* — Barnes & Thornburg LLP

(57) ABSTRACT

A device for use with soft robotic devices comprises soft fluidic actuators, a microfluidic/minifluidic valves and channels module, a fluidic module, sensors, and a control module. The actuators are operable to apply predetermined effects to surfaces and/or objects. The microfluidic/minifluidic valves and channels module has micro/mini fluidic channels and on-chip fluidic pressure-controlled pinch valves forming a fluidic network. Each pinch valve has a
(Continued)

valve pinch chamber, a membrane layer, and a valve control pressure chamber. The control module receives signals from the sensors and controls the fluidic module to control the pinch valves to induce flow of fluid under pressure to the actuators. An active compression apparel may include the device, and may have a skin contact backing layer and a strain-limiting backing layer sandwiching the actuators which are operable to provide compression to the skin and/or limb of a user through the at least one backing layer.

20 Claims, 28 Drawing Sheets

(51) Int. Cl.
*F15C 5/00* (2006.01)
*F16K 7/07* (2006.01)
*F16K 99/00* (2006.01)

(52) U.S. Cl.
CPC ...... *F16K 99/0015* (2013.01); *F16K 99/0055* (2013.01); *F16K 2099/008* (2013.01)

(58) Field of Classification Search
USPC .......................................................... 137/832
See application file for complete search history.

(56) References Cited

U.S. PATENT DOCUMENTS

| 8,550,119 | B2 | | 10/2013 | Unger et al. |
| 8,763,641 | B2 | | 7/2014 | Zhou et al. |
| 9,046,192 | B2 | * | 6/2015 | Mescher ............. F16K 99/0055 |
| 9,375,716 | B2 | * | 6/2016 | Schultz ................. C12Q 1/6869 |
| 10,013,002 | B2 | * | 7/2018 | Groen .................. G05D 7/0694 |
| 10,155,250 | B2 | * | 12/2018 | Chou .................. F16K 99/0001 |
| 2006/0076068 | A1 | | 4/2006 | Young et al. |
| 2007/0237686 | A1 | | 10/2007 | Mathies et al. |
| 2008/0249510 | A1 | | 10/2008 | Mescher et al. |
| 2018/0193833 | A1 | * | 7/2018 | Venzac ............... F16K 99/0003 |
| 2018/0296425 | A1 | | 10/2018 | Lamb et al. |

OTHER PUBLICATIONS

Bartlett, et al., "A Fluidic Demultiplexer for Controlling Large Arrays of Soft Actuators, "Soft Matter, 2020, pp. 1-7.
Connolly, et al., "Sew-free Anisotropic Textile Composites for Rapid Design and Manufacturing of Soft Wearable Robots, "Extreme Mechanics Letters, 2019, vol. 27, pp. 52-58.
Hoang, et al., "A Pneumatic Random-access Memory for Controlling Soft Robots, "Plos One, vol. 16(7), 2021, pp. 1-25.
Hubbard, et al., "Fully 3D-printed Soft Robots With Integrated Fluidic Circuitry, "Science Advances, 2021, vol. 7, pp. 1-12.
Preston, et al., "Digital Logic for Soft Devices, "Proceedings of the National Academy of Sciences, 2019, pp. 1-10.
Xu, et al., "Electronics-free Logic Circuits for Localized Feedback Control of Multi-actuator Soft Robots, "IEEE Robotics and Automation, 2020, pp. 3990-3997.

\* cited by examiner

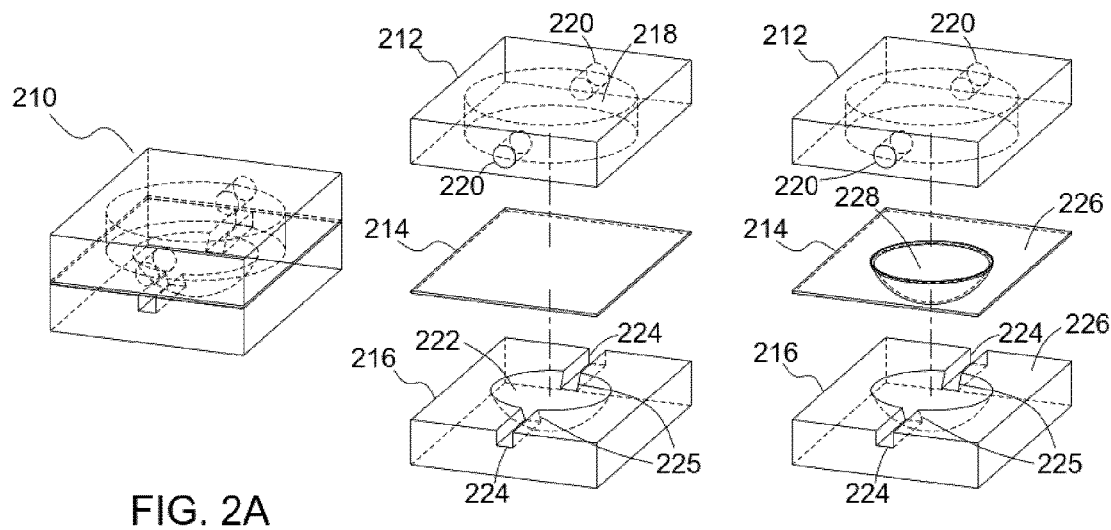
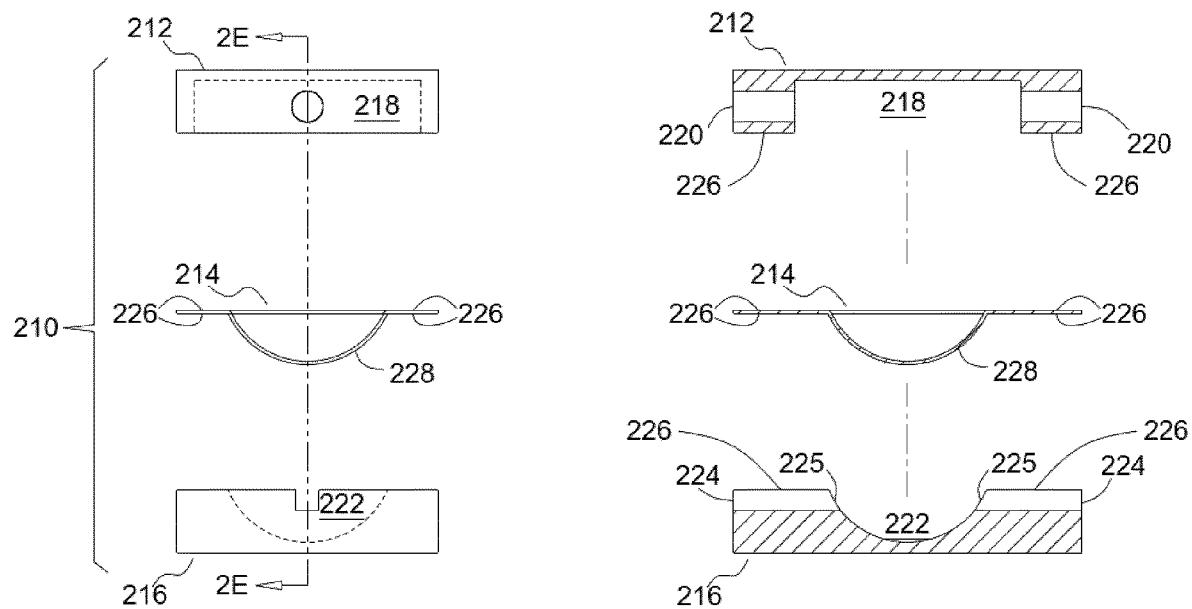
FIG. 2A  FIG. 2B  FIG. 2C  FIG. 2D  FIG. 2E

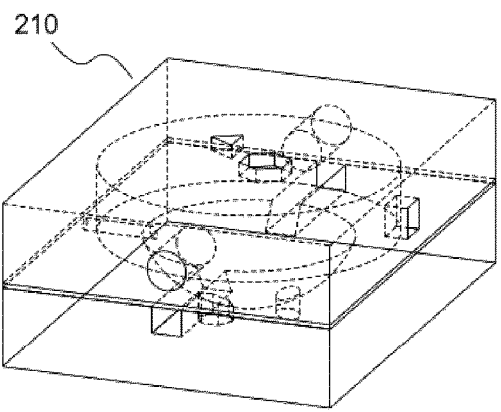
FIG. 4A
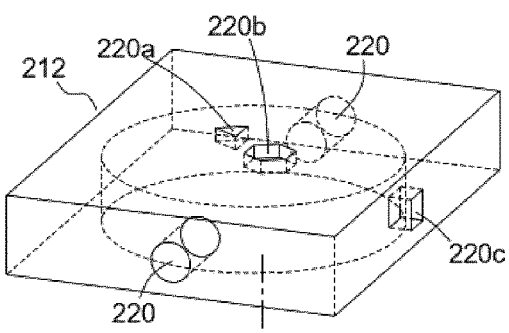
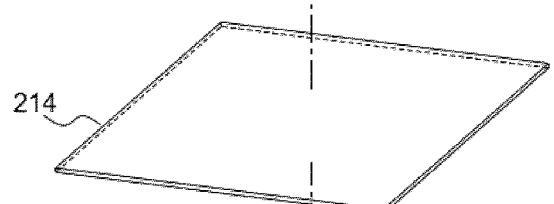
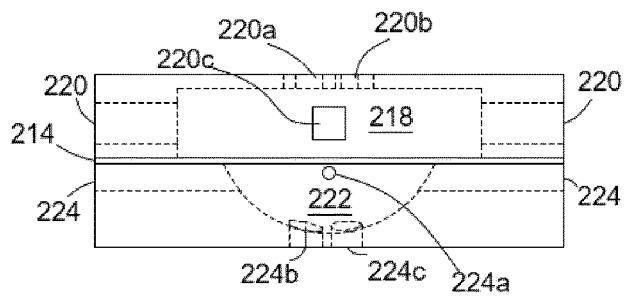
FIG. 4B
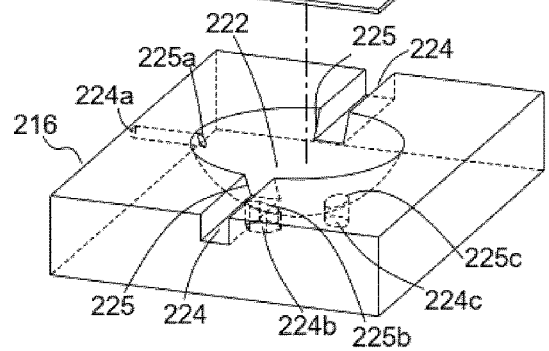
FIG. 4C

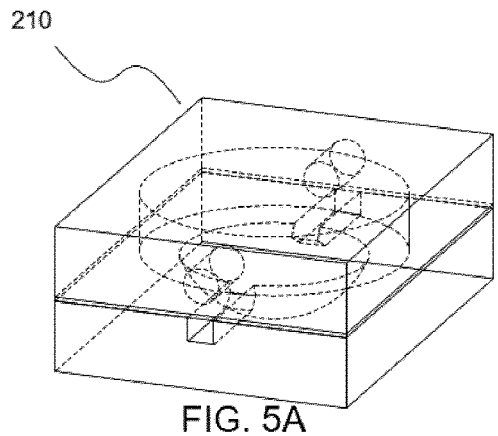
FIG. 5A
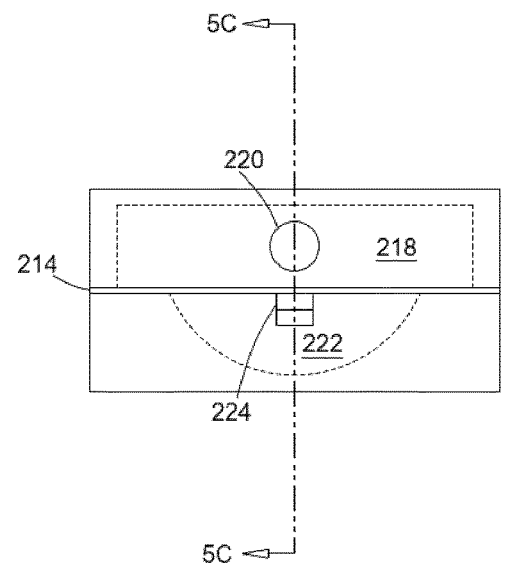
FIG. 5B
FIG. 5C
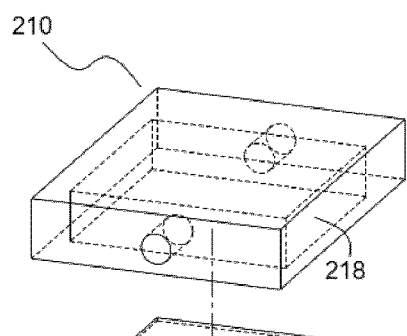
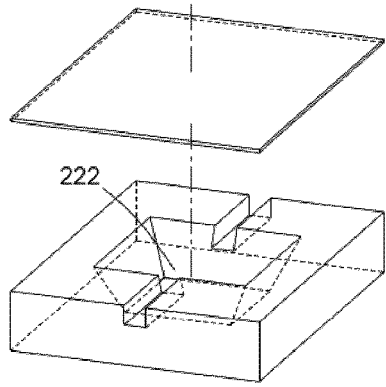
FIG. 6
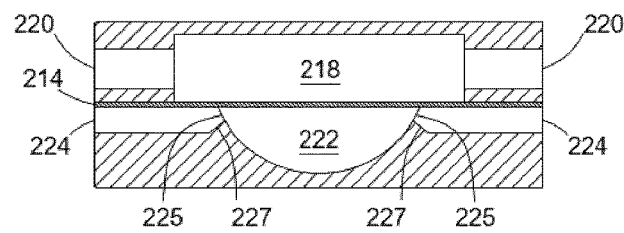

MICROFLUIDIC VALVES AND CHANNELS AND MINIFLUIDIC VALVES AND CHANNELS ENABLED SOFT ROBOTIC DEVICE, APPAREL, AND METHOD

CROSS-REFERENCE TO RELATED APPLICATIONS

This application is a US national stage application under Section 371 of PCT Application No. PCT/CA2022/051677, filed on Nov. 14, 2022, which claims priority from U.S. Provisional Application No. 63/279,105, filed on Nov. 13, 2021, the contents of which are each incorporated by reference herein in their entireties.

FIELD OF THE INVENTION

The present invention generally relates to the field of assistive devices, and more specifically to soft robotics for enhancing rehabilitation, function, sports, recreation, exercise recovery, massage, activities of daily living and increasing quality of life for its users. Even more specifically, the present invention uses microfluidics and minifluidics techniques to enable soft robotic devices and systems. Even more specifically, the present invention uses microfluidic and minifluidic valves and channels and soft fluidic actuators designs and fabrication methods to create soft robotic devices and systems to enhance the users' lives.

BACKGROUND OF THE INVENTION

Fluid actuated systems has long been used to manage circulatory disorders such as lymphedema, deep vein thrombosis (DVT) and dependent edema. They have also been used for massages and mechanotherapy such as muscle recovery for sports, joint rehabilitation after an injury or chronic degenerative diseases such as osteoarthritis. Fluid actuated systems has also gained popularity in creating soft robots as assistive devices.

Often, fluid actuated systems or soft robots comprise numerous fluidic bladders of different shapes and types, also known as soft fluidic actuators used to form an augmenting force or torque to provide rehabilitation or assistance to the human body. The soft fluidic actuators are often independently controlled, meaning that they are independently pressurized and depressurized or inflated and deflated.

The soft fluidic actuators may be actuated by liquid or gas. Typically, each soft fluidic actuator is independently controlled by an electromechanical solenoid valve or equivalent for active inflation and/or deflation. As soft robots comprise of increasing number of soft fluidic actuators, the number of electromechanical solenoid valves increases, increasing the soft robot's size, cost, weight, and energy consumption. This has limited the commercial viability of portable and wearable soft robotic systems. The control box or sub systems required to house the electromechanical solenoid valves, or equivalent, are too large and heavy to be worn or perceived wearable by a person. In addition, the cost of the soft robotic systems would be too expensive as well. Therefore, the goal is to reduce the number of electromechanical solenoid valves, or equivalent, to as few as possible. In other words, to miniaturize the control hardware and reduce the energy consumption of soft robots.

DESCRIPTION OF PRIOR ART

Patent reference WO 2015/102723 A2 may disclose a mechanically programmed soft fluidic actuator that may be configured to bend, linearly extend, contract, twist or any combinations thereof with usage of a sleeve wrapped around part of the soft actuator.

U.S. Pat. No. 10,155,250B2 may disclose a microfabricated elastomeric valve and pump system.

U.S. Pat. No. 8,550,119B2 may disclose a microfabricated elastomeric valve and pump system.

U.S. Pat. No. 8,763,641B2 may disclose a microfluidic pump and valve structures and fabrication methods.

U.S. Pat. No. 9,046,192B2 may disclose a membrane-based fluid control in microfluidic devices.

Patent reference WO2020257925A1 may disclose an air microfluidics and air minifluidics enabled active device, apparel, and method in which the inventors (who are also co-inventors of the invention described herein) describe an active compression that miniaturizes the control system by utilizing the theory of equivalent hydraulic resistance and/or an electrical circuit analogy to minimize the number of electromechanical valves or equivalent. The physical embodiment of this invention is an air microfluidics chip that consists of many microfluidic and minifluidic channels placed in series or parallel with each other in a network allowing for sequential inflation of a series of soft fluidic actuators in a preprogrammed manner regarding pressure and timing.

U.S. Pat. No. 7,766,033B2 may disclose a membrane valves and latching valve structure for microfluidic devices in the form of a demultiplexer which may be used to form pneumatic logic circuits, including processors.

Patent reference US2018/0296425A1 may disclose a system and method of bellow actuators for a fluidic exoskeleton system.

Research journal article titled "A fluidic demultiplexer for controlling large arrays of soft actuators" (DOI: 10.1039/c9sm02502b) by Bartlett et al. may disclose a soft microfluidic demultiplexer for controlling of soft robotic actuators.

Research journal article titled "A pneumatic random-access memory for controlling soft robots" (https://doi.org/10.1371/journal.pone.0254524) by Hoang et al. may disclose an eight-bit nonvolatile random-access pneumatic memory (RAM) that can maintain the states of multiple fluidic vacuum-controlled actuators.

Research journal article titled "Fully 3D-printed soft robots with integrated fluidic circuitry" (DOI: 10.1126/sciadv.abe5257) by Hubbard et al. may disclose fully 3D-printed soft robots with fluidic diodes, "normally closed" transistors, and "normally open" transistors with geometrically tunable pressure-gain functionalities.

Research journal article titled "Digital logic for soft devices" (https://doi.org/10.1073/pnas.1820672116) by Preston et al. may disclose soft, pneumatic NOT, AND, and OR digital logic gates that may be combined into digital logic circuits for controlling and powering soft actuators.

Research journal article titled "Electronics-free logic circuits for localized control of multi-actuator soft robots" (DOI: 10.1109/LRA.2020.2982866) by Xu et al. may disclose soft switch-valves that can be embedded distributively in the skins of soft robots.

Research journal article titled "Sew-free anisotropic textile composites for rapid design and manufacturing of soft wearable robots" (https://doi.org/10.1016/j.eml.2019.01.007) by Connolly et al. may disclose a fabrication method utilizing water-soluble polymer to create soft fluidic actuators.

However, the prior art canvassed above may have suffered from one or more significant problems and/or shortcomings.

For example, all of this prior art may have suffered from one or more problems including but not limited to the following: (a) lack of wearability regarding on-the-go usage; (b) inefficient and/or bulky actuation hardware; (c) using only constant passive actuation methods; (d) unable to achieve sequential actuation and/or selective independent actuation of a plurality of soft fluidic actuators; (e) inefficient large volume soft fluidic actuators; (f) not designed for the application of soft robotic devices and apparels; (g) poor user compliance, perhaps at least in part due to mechanical, electronics, and/or software shortcomings, and/or (h) challenging to manufacture.

What may be needed are microfluidic valves and channels and minifluidic valves and channels enabled soft robotic device, apparel, and method, or wearable and/or portable microfluidic valves and channels and minifluidic valves and channels device, garment, and method for soft robotic device and apparels, or a design and/or method to fabricate soft robotic devices and apparel.

It may be desirable to provide a soft robotic device, apparel, and/or method that may find advantageous utility in association with applications including but not limited to the following: (i) Lymphedema treatment; (ii) Osteoarthritic knee unloading braces—unicompartmental and/or multi-compartmental unloading and proprioception; (iii) Deep vein thrombosis treatment; (iv) Dynamic prosthetic socket liners; (v) Joint stabilization sleeves—post-surgery or prophylactic; (vi) Neck and back massages; (vii) Repetitive strain injury treatment, including, for example, muscles, ligaments, tendons, and/or carpal tunnel; (viii) Workout massages—warmup, recovery and lactic acid removal; and/or (ix) Athleisure apparel, i.e. yoga pants, compression clothing, and sports bras—movement/posture synchronized force tactile sensation and haptics during a workout.

It may also be desirable to provide a soft robotic system, device, and/or method that may find advantageous utility in association with applications including but not limited to the following: (i) prostheses, (ii) minimally invasive surgery, (iii) neuromuscular rehabilitation, (iv) rescue robotics, (v) undersea exploration robotics.

It may be an object according to one aspect of the invention to provide a microfluidic valves and channels and minifluidic valves and channels enabled active compression device, apparel, and/or method.

It may be an object according to one aspect of the invention to provide a wearable microfluidic valves and channels and minifluidic valves and channels enabled device, garment, and/or method for active compression.

It may be an object according to one aspect of the invention to provide a microfluidic valves and channels and minifluidics valve and channels enabled soft robotic device, apparel, and/or method.

It may be an object according to one aspect of the invention to provide a wearable microfluidic valves and channels and minifluidic valves and channels enabled device, apparel, and/or method for soft robots.

It may be an object according to one aspect of the invention to provide a design and/or method for fabrication of soft fluidic actuators for soft robots.

It may be an object according to one aspect of the invention to provide a design and/or method for fabrication of soft fluidic actuators for active compression devices and/or apparels.

It is an object of the present invention to obviate or mitigate one or more disadvantages and/or shortcomings associated with the prior arts, and/or to meet or provide for one or more needs and/or advantages, and/or to achieve one or more objects of the invention—one or more of which may preferably be readily appreciable by and/or suggested to those skilled in the art in view of the teachings and/or disclosures hereof.

SUMMARY OF THE INVENTION

According to the invention, there is disclosed a wearable microfluidics and minifluidics device, for use with one or more soft robotic devices worn or used by a user. The device preferably comprises one or more soft fluidic actuators, at least one microfluidics and minifluidics valves and channels module, at least one fluidic module, one or more sensors, and at least one control module. The soft fluidic actuators are preferably integrated with the soft robotic device, and apply one or more predetermined forces and/or torques to one or more anatomical portions of the user's body and/or a portion/whole of the soft robotic device when inflated/pressurized and/or deflated/depressurized with fluid. The forces preferably include active compression and/or augmenting forces and/or torques. (Persons having ordinary skill in the art should readily appreciate, in view of the disclosure herein, that the term "soft fluidic actuators" may be broad enough to reasonably encompass anything that, through inflation/pressurization and/or deflation/depressurization, can apply the forces to the anatomical portions of the user's body and/or the soft robotic device itself—including, for example, balloon actuators, tube actuators, fluidic capacitors among other things) The microfluidics and minifluidics valves and channel module preferable includes one or more small-scale fluidic channels in the form of microfluidic channels and/or minifluidic channels and/or one or more on-chip pinch valves. The microfluidics and minifluidics valves and channels module preferably is in fluid communication via the one or more small-scale fluidic channels and/or one or more on-chip pinch valves with the one or more soft fluidic actuator. The fluidic module, when activated, preferably induces flow of the fluid under pressure, through one or more small-scale fluidic channels and/or one or more on-chip pinch valves, to and from one or more soft fluidic actuators. The one or more sensors preferably is/are integrated with the soft robotic device, and generate signals based on but not limited to pressure data, biometric data, orientation data, user motion detected at the soft robot and/or the user. Preferably, the control module selectively, depending upon the signals from the one or more sensors, activates the fluidic module to inflate and/or deflate the one or more soft fluidic actuators to apply the predetermined forces or torques to at least one anatomical portion of the user's body and/or a portion of the soft robotic device itself.

According to an aspect of a preferred embodiment of the invention, the microfluidics and minifluidics valves and channels module(s), the fluidic module(s), and/or the control module(s) may preferably, but need not necessarily, be securely attached to the soft robot.

According to an aspect of a preferred embodiment of the invention, the one or more small-scale fluidic channels and the one or more on-chip pinch valves maybe preferably, but need not necessarily, be integrated as a single component.

According to an aspect of a preferred embodiment of the invention, the at least one microfluidics and minifluidics valves and channels module may preferably, but need not necessarily, be configured to utilize equivalent hydraulic resistance and/or to induce passive delays in pressurization and/or depressurization of one or more soft fluidic actuators.

According to an aspect of a preferred embodiment of the invention, the on-chip pinch valves may preferably, but need not necessarily, be on-chip fluidic pressure-controlled pinch valves.

According to an aspect of a preferred embodiment of the invention, the on-chip pinch valves may preferably, but need not necessarily, comprise three subcomponents, a valve control layer, a flexible and/or elastic membrane layer, and a valve pinch layer. (Persons having ordinary skill in the art should readily appreciate, in view of the disclosures herein, that the term "elastic" may be broad enough to reasonably encompass various forms of elasticity—for example, hyperelastic and/or hyper-elasticity, among others.) The valve control layer comprises at least one valve control pressure chamber and at least one fluid connection channels to the valve control pressure chamber. The valve pinch layer comprises at least one valve pinch chamber and at least one fluid connections channel connected to the valve pinch chamber. The membrane layer is located in between the valve control layer and the valve pinch layer; the membrane layer makes up at least one wall of the valve control pressure chamber and the valve pinch chamber. The valve control layer and the valve pinch layer permanently or semi-permanently bond to the membrane layer at certain surface locations, forming a seal where fluid may not cross over from the control pressure chamber to the valve pinch chamber and vice-versa. The portion on the membrane layer where no bonding occurs between the aforementioned layers becomes freestanding and may be flexed, deflected and/or stretched when pressure and/or force is applied. The membrane layer may deflect, stretch and/or flex under an imbalance of fluidic pressure between the at least one valve control pressure chamber and the at least one valve pinch chamber to partially and/or fully stop fluid flow of one fluid connection channel through the valve pinch chamber.

According to an aspect of a preferred embodiment of the invention, the on-chip pinch valves may preferably, but need not necessarily, be controlled by fluidic pressure to fully and/or partially close and open.

According to an aspect of any embodiments of the invention, any on-chip pinch valve's opening between a fluid connection channel and the valve pinch chamber may be tapered and take on any physical characteristic including but not limited to size, shape, geometry, location, and/or orientation.

According to an aspect of any embodiments of the invention, any on-chip pinch valve's fluid connection channels may be microfluidic channels and/or minifluidic channels having any physical characteristics and/or connected to fluidic channels and/or pathways that are microfluidic channels and/or minifluidic channels of any physical characteristics.

According to an aspect of any embodiment of the invention, the on-chip pinch valves may be upstream and/or downstream of any fluidic channels.

According to an aspect of any embodiment of the invention, any on-chip pinch valve's valve control chamber and/or valve pinch chamber may be fluidly connected to one or a plurality of other on-chip pinch valves' valve control chamber and/or valve pinch chamber and/or to one or a plurality of microfluidic and/or minifluidic channels in series and/or parallel.

According to an aspect of some of the embodiments of the invention, a single control pressure chamber and/or single membrane layer may be shared by at least two on-chip pinch valves.

According to an aspect of some of the embodiment of the invention, the at least one microfluidics and minifluidics valves and channels module with at least one on-chip pinch valves and at least one microfluidic and/or minifluidic channel when receiving fluidic pressure and flow from the fluidic module allow for sequential, gradient, uniform, independent inflation control and/or deflation control of one or more soft fluidic actuators connected and/or communicate fluidly with the at least one microfluidics and minifluidics valves and channels module.

According to an aspect of a preferred embodiment of the invention, the microfluidics and minifluidics valves and channels module may preferably, but need not necessarily, also include: (a) one or more microfluidic and minifluidic chips, and/or (b) fluidic channel pathways that may preferably, but need not necessarily, be integrated with the soft robot at selective locations. (Persons having ordinary skill in the art should readily appreciate, in view of the disclosures herein, that the term "channel pathways" may be broad enough to reasonably encompass various forms of the physical embodiments of fluidic communications conduits—for example, tubing, manifold, chambers, among other things and whether elastic, flexible, rigid, or any combination thereof.) The small-scale fluidic channels and the on-chip valves may preferably, but need not necessarily, be embodied in microfluidic and minifluidic chips, microfluidic and minifluidic chip sockets and/or in the fluidic channel pathways. The at least one microfluidic and minifluidic chip, microfluidic and minifluidic chip socket and the fluidic channel pathways may be flexible, elastic, rigid or any combination thereof.

According to an aspect of a preferred embodiment of the invention, the microfluidic and minifluidic module may preferably, but need not necessarily, include a microfluidic and minifluidic chip socket. The microfluidic and minifluidic chip socket may preferably, but need not necessarily, be adapted to receive at least a first selected one of the microfluidic and minifluidic chips in fluid communication with the fluidic channel pathways.

According to an aspect of a preferred embodiment of the invention, the microfluidic and minifluidic chip socket may preferably, but need not necessarily, receive the aforesaid first selected one of the microfluidic and minifluidic chips in selectively removable relation. The microfluidic and minifluidic chip socket may preferably, but need not necessarily, be further adapted to alternately receive a second selected one of the microfluidic and minifluidic chips in fluidic communication with the fluidic channel pathways.

According to an aspect of a preferred embodiment of the invention, the soft fluidic actuators may preferably, but need not necessarily, be elastic and/or flexible. (Persons having ordinary skill in the art should readily appreciate, in view of the disclosures herein, that the term "elastic" may be broad enough to reasonably encompass various forms of elasticity—for example, hyper-elastic and/or hyper-elasticity, among others.)

According to an aspect of a preferred embodiment of the invention, the soft fluidic actuators may preferably, but need not necessarily, produce compression, torques, forces, and/or motion to an anatomical portion of the user's body and/or the soft robotic device itself.

According to an aspect of any embodiments of the invention, the soft fluidic actuators may take on any physical characteristics including but not limited to shape, volume, size, wall thickness, material property, and/or internal fluidic chamber structure.

According to an aspect of a preferred embodiment of the invention, the soft fluidic actuators may preferably, but need not necessarily, be stacked, overlapping and/or overlaid.

According to an aspect of a preferred embodiment of the invention, multiple interconnected and/or independent soft fluidic actuator chambers are overlaid and/or stacked with the outer surface of a wall layer of soft fluidic actuator chamber bonded at selective locations to the wall layer of at least one other soft fluidic actuator chamber at selective locations.

According to an aspect of a preferred embodiment of the invention, the soft fluidic actuators may preferably, but need not necessarily, be bellow/accordion-shaped soft fluidic actuators to provide force, torque, compression, bending motion, linear motion or any combination thereof.

According to an aspect of a preferred embodiment of the invention, the soft fluidic actuators may preferably, but need not necessarily, be a plurality of overlapping independent soft fluidic actuators to provide compression; the overlapping may of any percentage and/or location.

According to an aspect of a preferred embodiment of the invention, the soft fluidic actuators may preferably, but need not necessarily, have at least one backing layer that may be integrated with any soft fluidic actuators to produce motion of the whole or a portion of the soft robot and/or limit the expansion and/or contraction of the soft fluidic actuators.

According to an aspect of some embodiments of the invention, the backing layer may be bonded completely, bonded partially, and/or not bonded to at least one soft fluidic actuator.

According to an aspect of a preferred embodiment of the invention, the fluidic module may preferably, but need not necessarily, include at least one pump, valve, pressure sensor, flow sensor, fluidic pathway, or any combination thereof.

According to an aspect of a preferred embodiment of the invention, the fluidic module may preferably, but need not necessarily, include at least one filter.

According to an aspect of a preferred embodiment of the invention, the fluidic module may preferably, but need not necessarily, include at least one flow sensor.

According to an aspect of a preferred embodiment of the invention, the fluidic module may preferably, but need not necessarily, include at least one fluidic silencer/muffler.

According to an aspect of a preferred embodiment of the invention, the fluidic module may preferably, but need not necessarily, draw fluid from ambient atmosphere.

According to an aspect of a preferred embodiment of the invention, the fluidic module may preferably, but need not necessarily, include a fluidic reservoir. The fluidic module may preferably, but need not necessarily, draw fluid from the fluidic reservoir.

According to an aspect of a preferred embodiment of the invention, the control center module may preferably, but need not necessarily, include software and electronic hardware for controlling the flow rate, flow direction, and/or pressure supplied by the fluidic module.

According to an aspect of a preferred embodiment of the invention, the control center module may preferably, but need not necessarily, be tasked with receiving, analyzing, and/or interpreting information from various sensors.

According to an aspect of a preferred embodiment of the invention, the control center module may preferably, but need not necessarily, be integrated within the control box of the soft robot.

According to an aspect of a preferred embodiment of the invention, the control box of the soft robot and/or the soft robot itself may have physical and/or virtual interfaces for interacting with users and/or for user interaction and/or control of the soft robot.

According to an aspect of a preferred embodiment of the invention, the soft robot may preferably, but need not necessarily, be adapted for use with a portable computing device that is preferably off-board the soft robot. The control center module may preferably, but need not necessarily, include one or more software components that, at least partially, are operatively executed and/or reside on the portable computing device.

According to an aspect of a preferred embodiment of the invention, any module and/or their subcomponents may, but need not necessarily, be integrated with the soft robot in selectively removable relation.

According to an aspect of a preferred embodiment of the invention, any and all of the major modules and/or their subcomponents presented herein may be combined together as one element and/or container or separated into multiple elements and/or containers.

According to an aspect of a preferred embodiment of the invention, any container enclosing any module and/or their subcomponents may preferably, but need not necessarily, be elastic, flexible, rigid, or any combination thereof.

According to an aspect of a preferred embodiment of the invention, the soft robot may preferably, but need not necessarily, also include at least one electrical power module that preferably electrically powers any modules and/or subcomponents requiring electrical power.

According to an aspect of a preferred embodiment of the invention, the electrical power module may preferably, but need not necessarily, include at least one battery and/or at least one electrical transmission system.

According to an aspect of a preferred embodiment of the invention, the battery may preferably, but need not necessarily, be rechargeable and/or replaceable.

According to the invention, there is also disclosed a method of making soft robotic devices, wherein the method comprises (a) cutting steps to create the subcomponents of the soft fluidic actuators, wherein one or more soft fluidic actuator wall layer, one or more soft fluidic actuator insert layer, and/or one or more soft fluidic actuator fluidic conduit; (b) bonding steps to create the soft fluidic actuators, wherein one or more soft fluidic actuator wall layer, one/or more soft fluidic actuator insert layers, and/or one or more soft fluidic conduit and bonded together to create at least one soft fluidic actuator chamber; and wherein fluid may enter the fluidic chamber via a fluidic conduit; (c) an integration step to combine the soft fluidic actuators with backing layers; wherein the backing layer may be elastic, flexible, rigid or any combination thereof.

According to an aspect of a preferred method of the invention, the insert layer has at least one surface that does not adhere and/or adhere non-permanently to wall layer.

According to an aspect of a preferred method of the invention, the insert layers may be taken out and/or left within the soft fluidic actuator.

According to an aspect of a preferred method of the invention, the wall layer has at least one surface that bonds permanently and/or semi-permanently to itself and/or a second wall layer.

According to an aspect of a preferred method of the invention, the insert layer when bonded with the wall layer replaces the fluidic conduit.

According to an aspect of a preferred method of the invention, multiple interconnected and/or independent soft fluidic actuator chambers are overlaid and/or stacked by bonding the outer surface of a wall layer of a first soft fluidic actuator chamber with a second soft fluidic actuator chamber.

According to an aspect of a preferred method of the invention, bellow/accordion-shaped soft fluidic actuators may be created to provide force, torque, compression, bending motion, linear motion or any combination thereof by varying the location and/or percentage of the bonded wall portions and/or varying the shape and/or volume of each soft fluidic actuator chamber.

According to an aspect of a preferred method of the invention, a plurality of overlapping independent soft fluidic actuators for providing compression can be created by varying the location and/or percentage of the bonded wall portions and/or varying the shape and/or volume of each soft fluidic actuator chamber.

According to the invention, there is also disclosed an example soft robot. Some of its system integration, fabrication, and/or applications may be described and/or illustrated below. Preferred embodiments, as well as various alternative embodiments of the systems, may also be described and/or illustrated below.

Perhaps at least part of this invention may lie in the junction point of soft robotics and/or microfluidic and minifluidic channels and valves technologies. One central and/or key distinguishing factor between this invention/improvement and prior arts may be in the use, methodology, and/or implementation of this technology. The on-chip valves may not be used as strict digital on/off valves, instead allows for analog partial opening and/or closing. The on-chip valves may also be used in combination and/or unison with microfluidic and/or minifluidic channels in a fluidic network for sequential, uniform, independent, gradient, inflation and/or deflation control of a plurality of soft fluidic actuators. The physical characteristics of the on-chip valves as well as its many features including but not limited to the opening between a fluid connection channel and the valve pinch chamber allowing for different closing/opening delta pressure for control of soft fluidic actuators pertaining to the usage with soft robots are useful and novel. The fluidic connection, fluidic communications and/or fluidic interaction between the on-chip valves and the microfluidic and minifluidic channels may be among novel features disclosed and/or taught according to the present invention. The usage of microfluidic and minifluidic chips and sockets allow for easy integration and/or replacement of a microfluidic and minifluidic chip. The utilities of soft fluidic actuators disclosed herein and fabrication methods of soft fluidic actuators disclosed herein allow for easy fabrication of soft fluidic actuators, particularly overlapping soft fluidic actuators of any physical characteristic and/or bellow/accordion-shaped soft fluidic actuators.

Other advantages, features and characteristics of the present invention, as well as methods of operation and functions of the related elements of the structure, and the combination of parts and economies of manufacture, will become more apparent upon consideration of this detailed description with reference to the figures which accompany this application.

BRIEF DESCRIPTIONS OF THE DRAWINGS

The novel features which are believed to be characteristic of the present invention, and related systems and methods according to the present invention, as to their structure, organization, use and method of operation, together with further objectives and advantages thereof, may be better understood from figures which accompany this application, in which presently preferred embodiments of the invention are illustrated by way of example. However, it is expressly understood that any such figures are for the purpose of illustration and description only and not intended as a definition of the limits of the invention. In the accompanying figures:

Figure 2F:
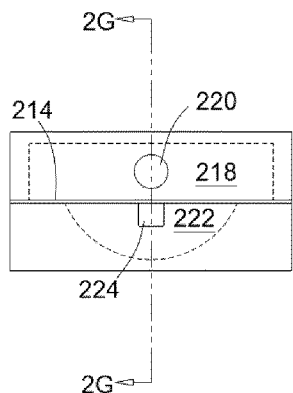
FIG. 2F is a front view of the embodiment of the single on-chip pinch valve as seen in FIG. 2A.
Figure 3A:
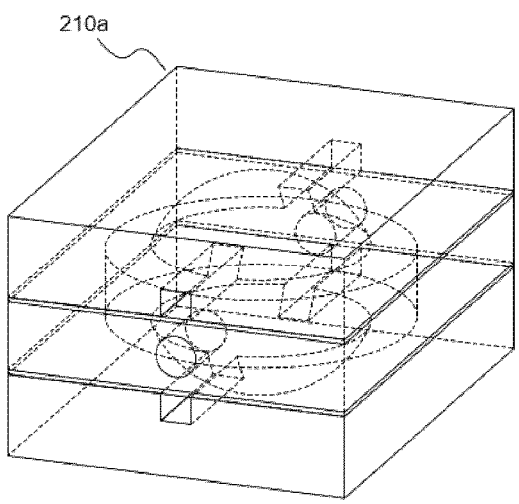
Figure 3B:
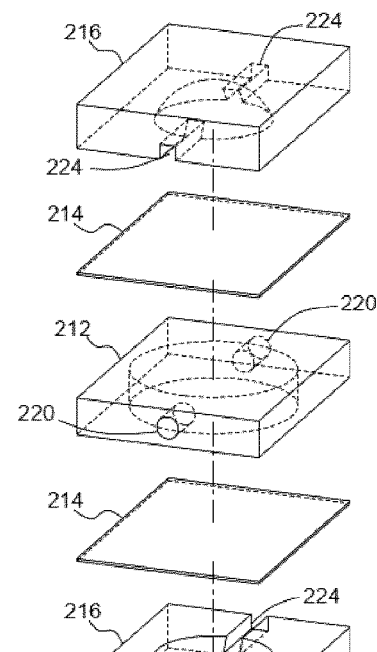
Figures 3C, 3D:
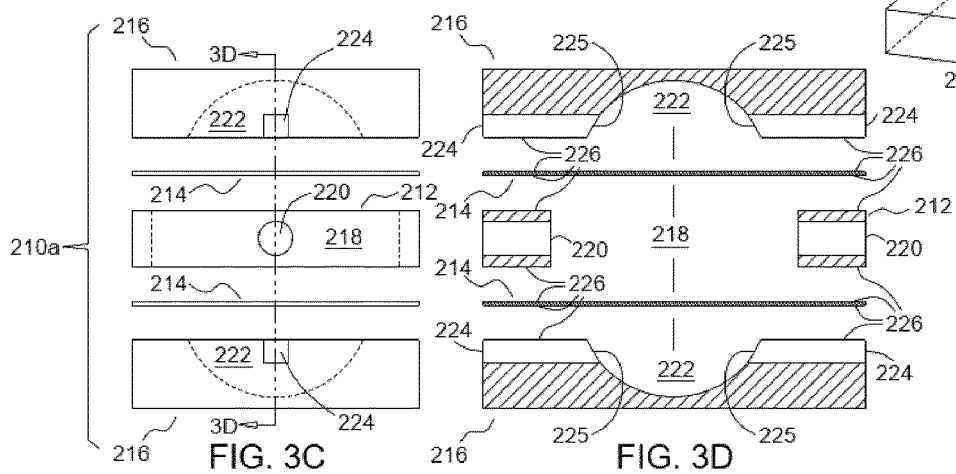
Figure 7A:
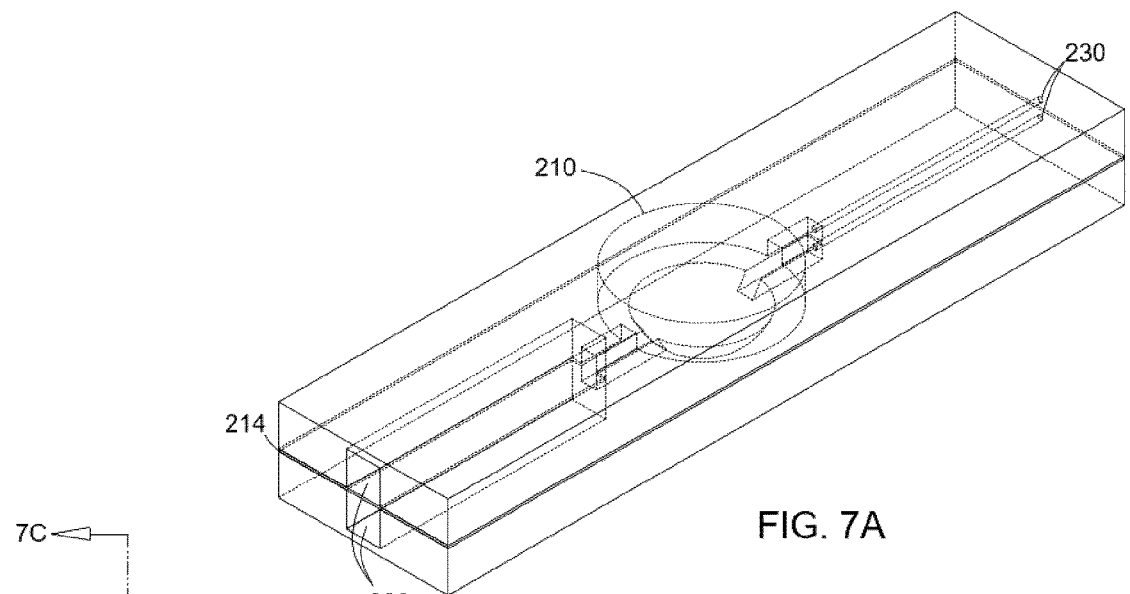
Figure 7B:
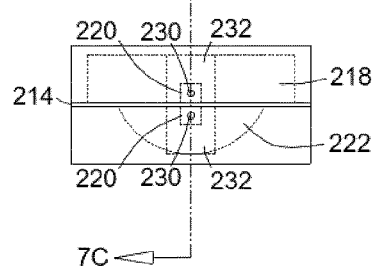
Figure 7C:
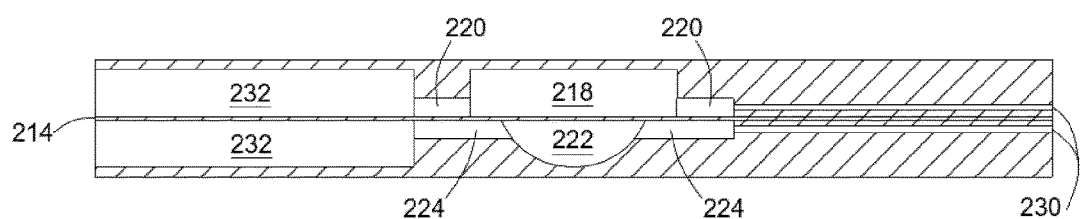
Figure 8A:
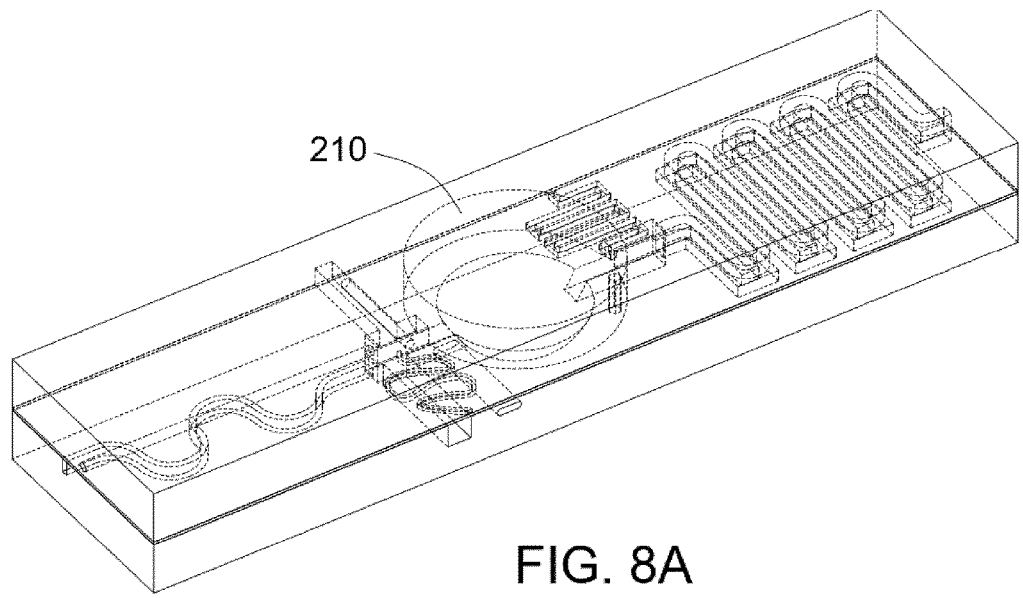
Figure 8B:
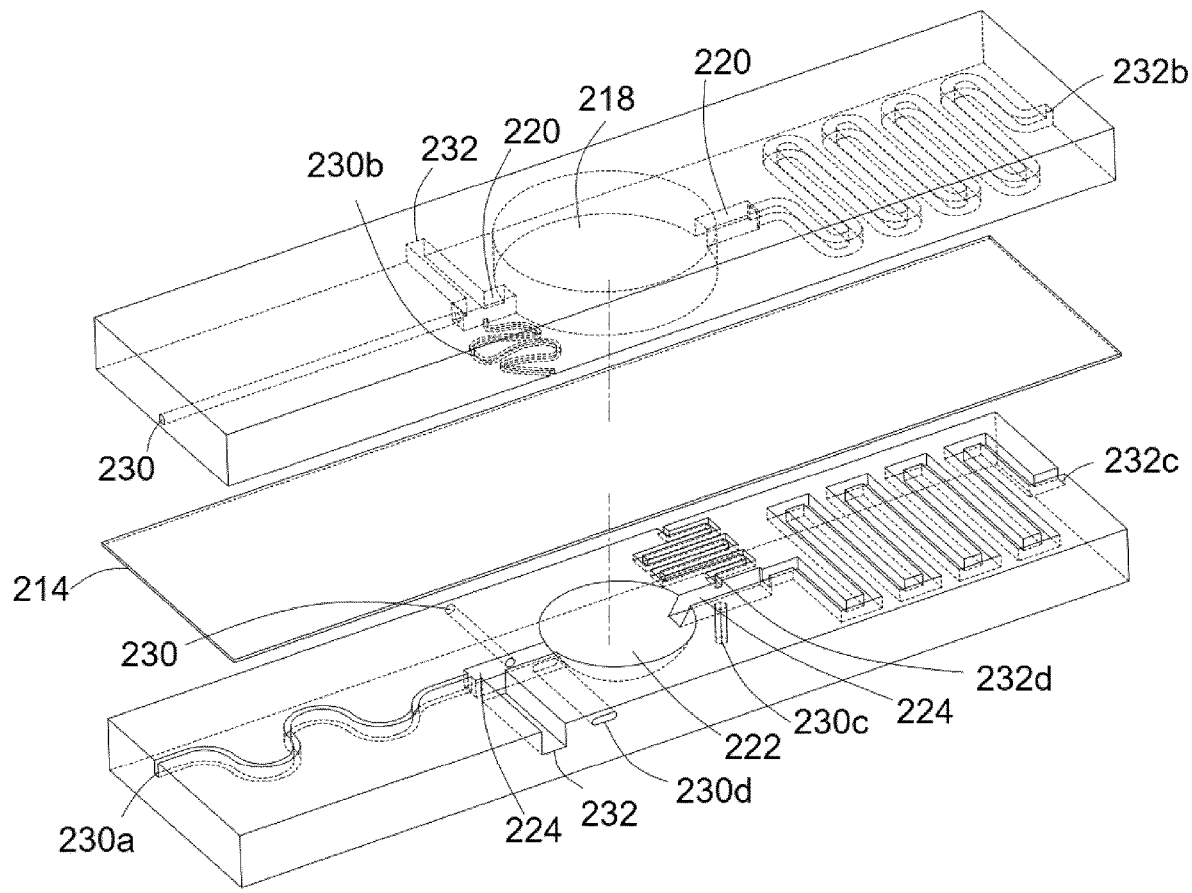
Figure 9A:
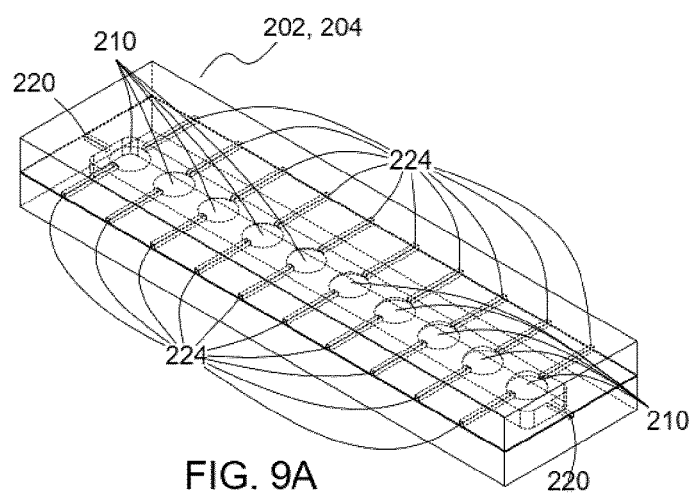
Figure 9B:
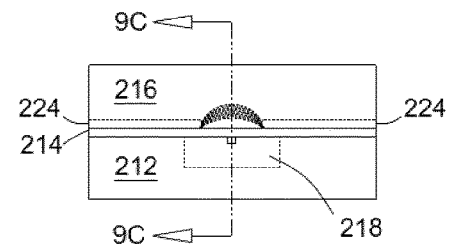
Figure 9C:
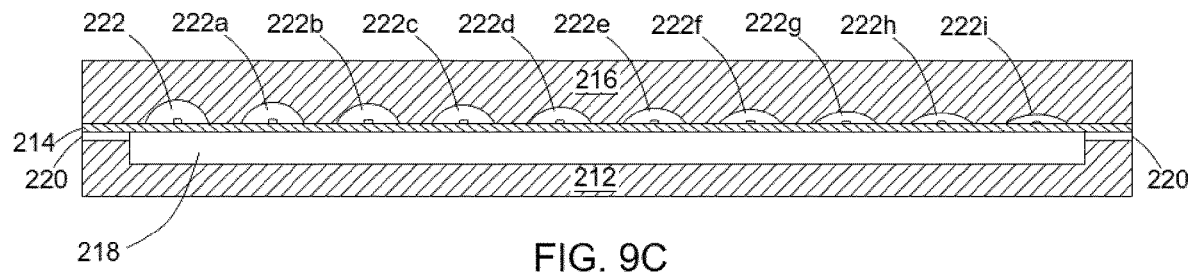
Figure 10A:
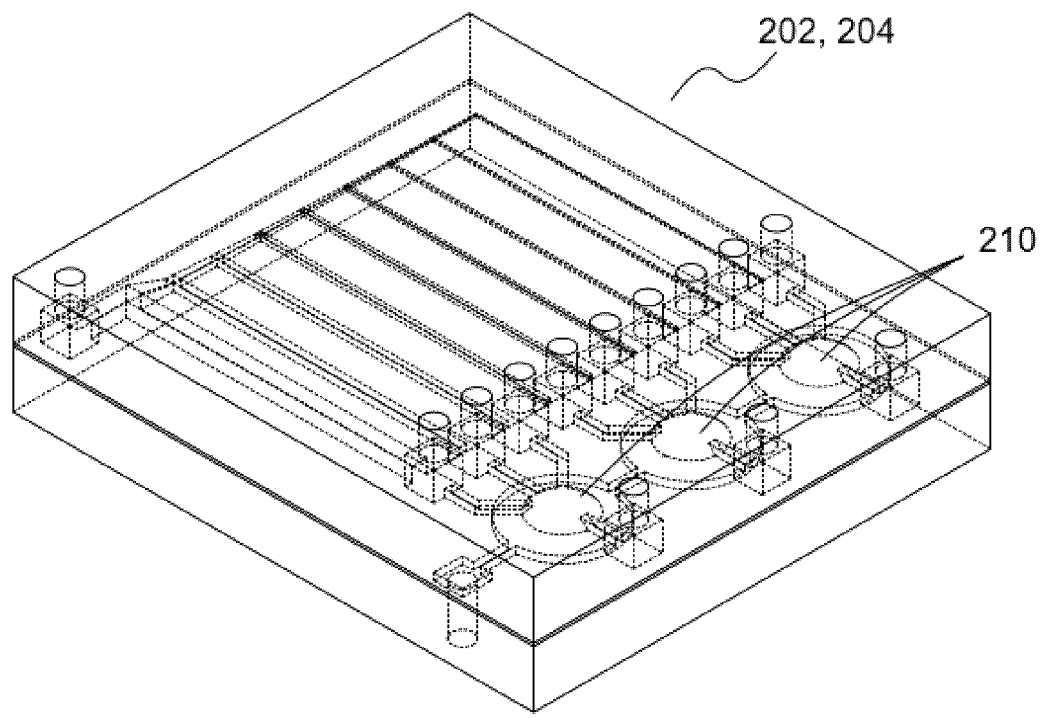
Figure 10B:
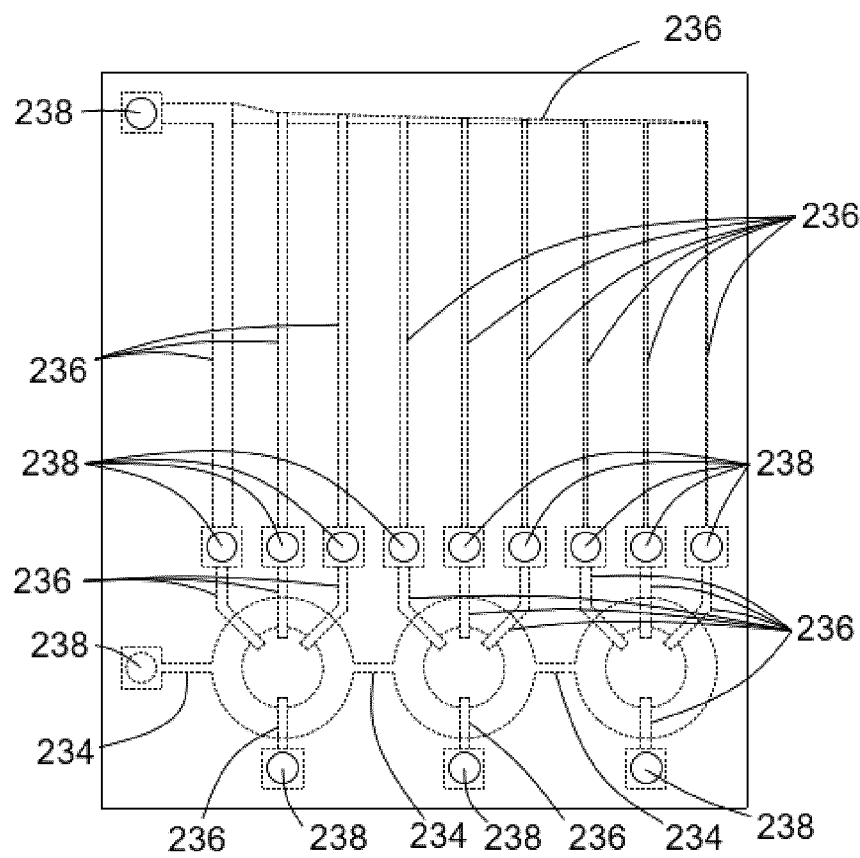
Figure 11A:
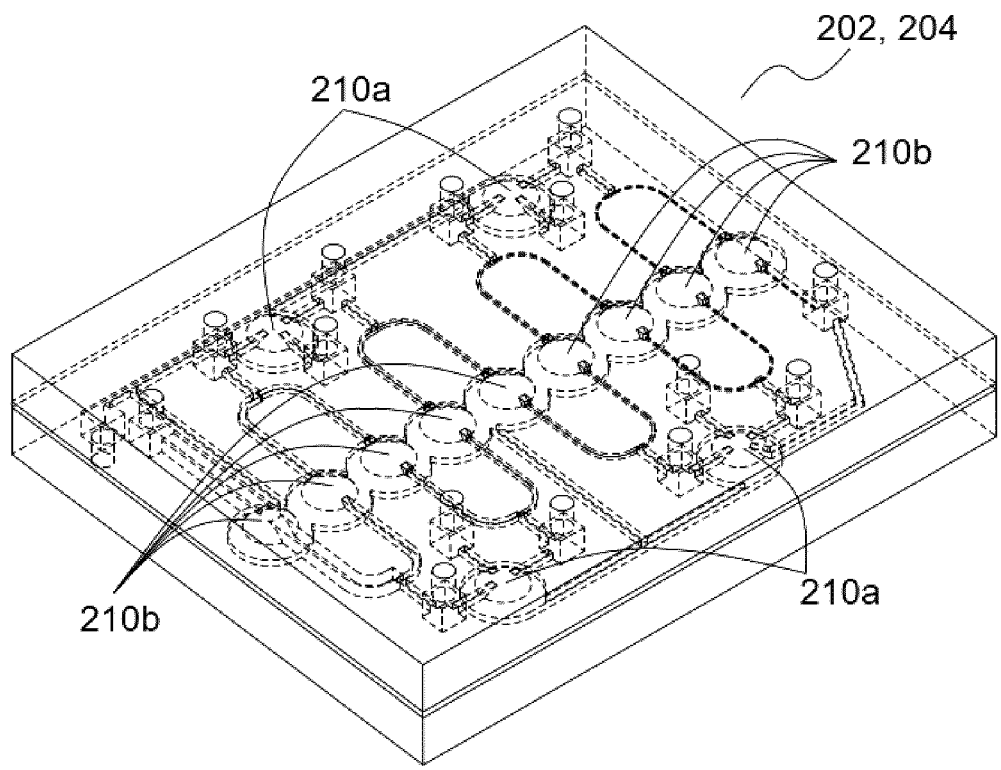
Figure 11B:
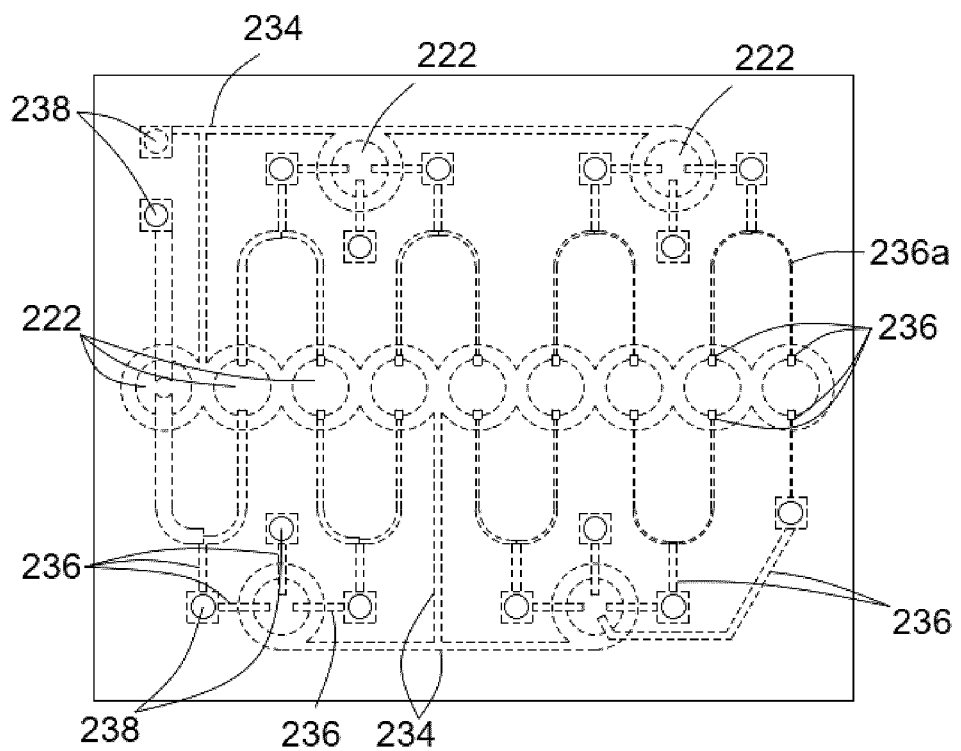
Figure 12A:
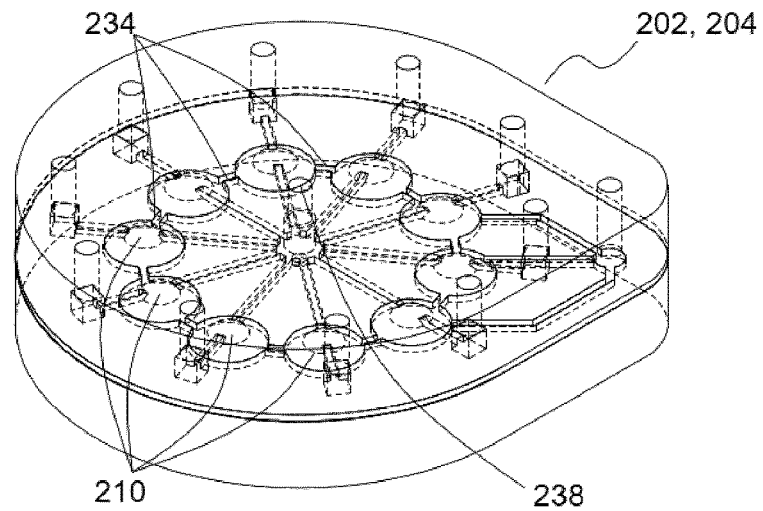
Figure 12B:
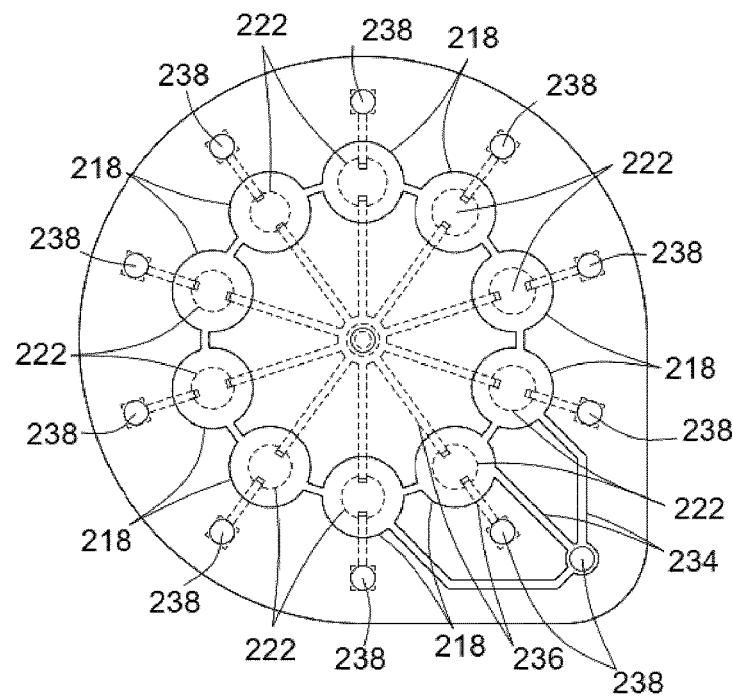
Figure 13A:
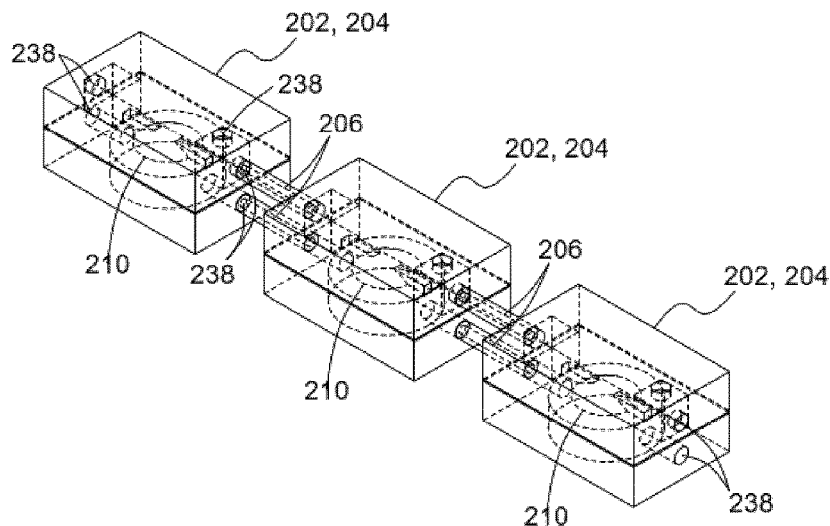
Figure 13C:
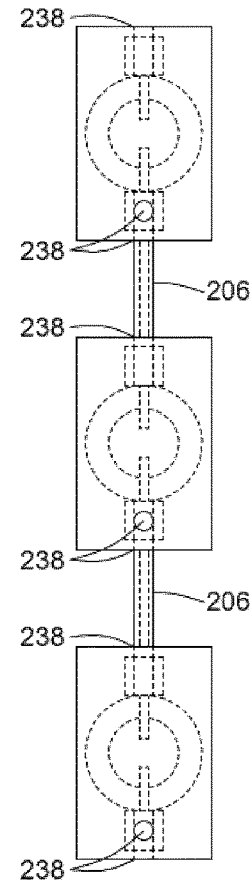
Figure 13B:
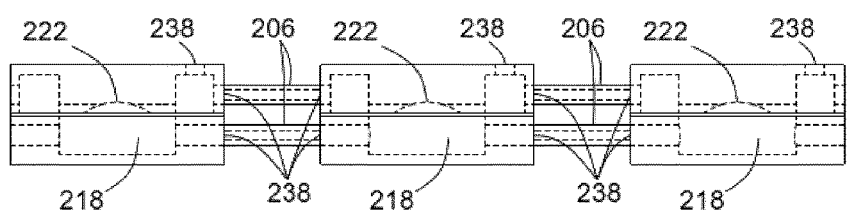
Figure 14:
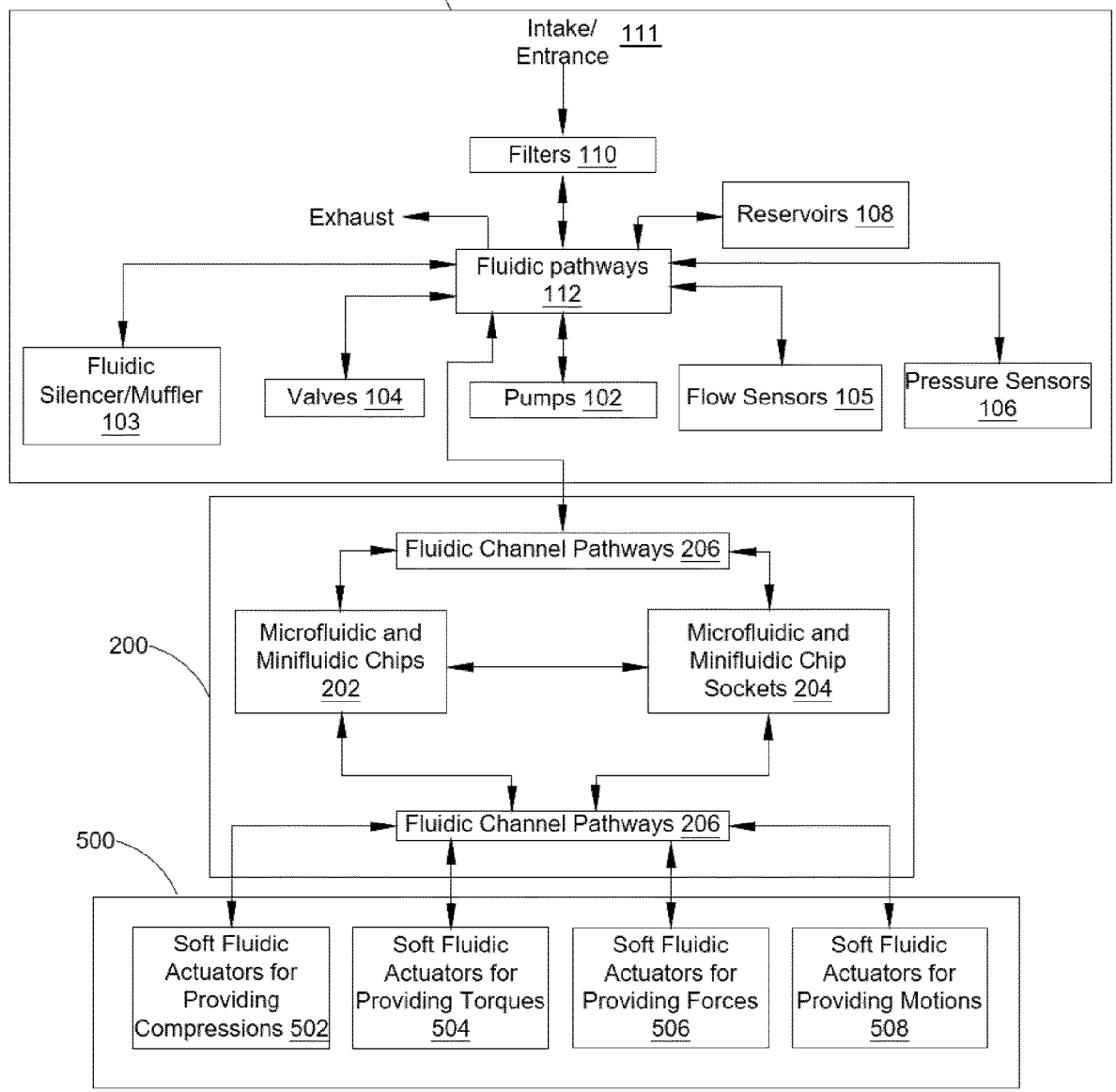
Figure 15:
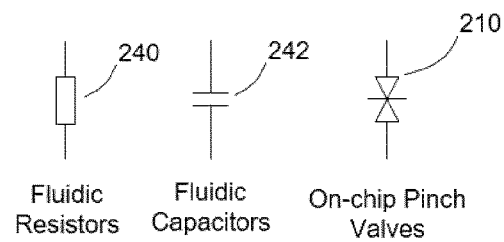
Figure 23A:
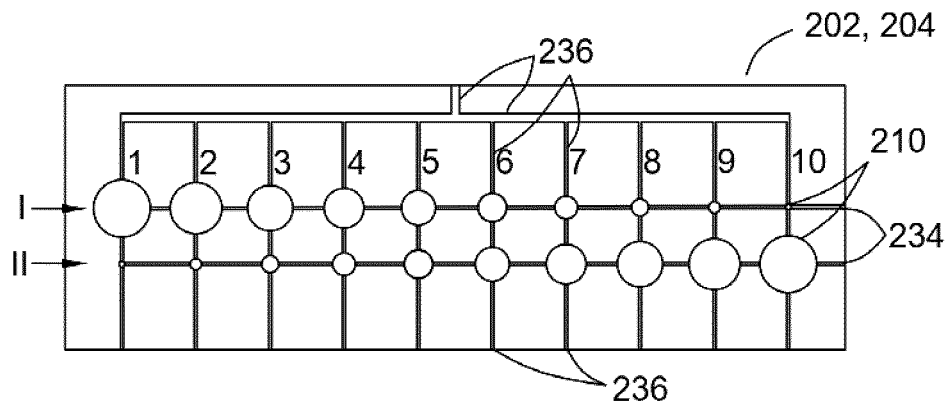
Figure 23B:
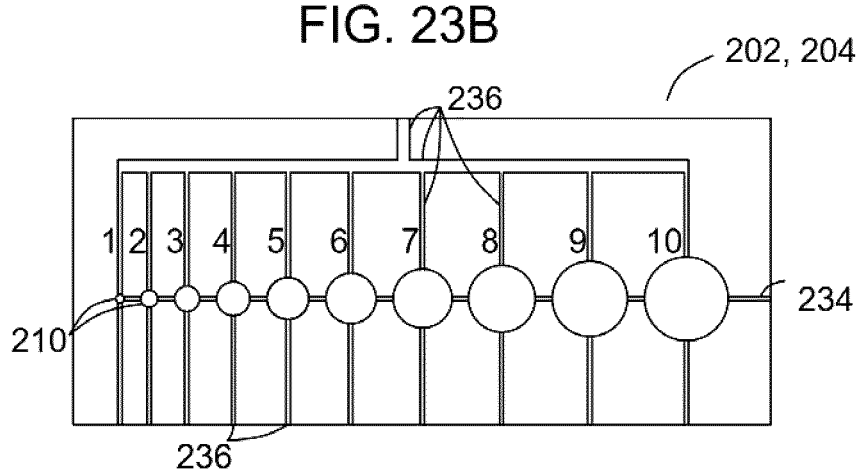
Figure 23C:
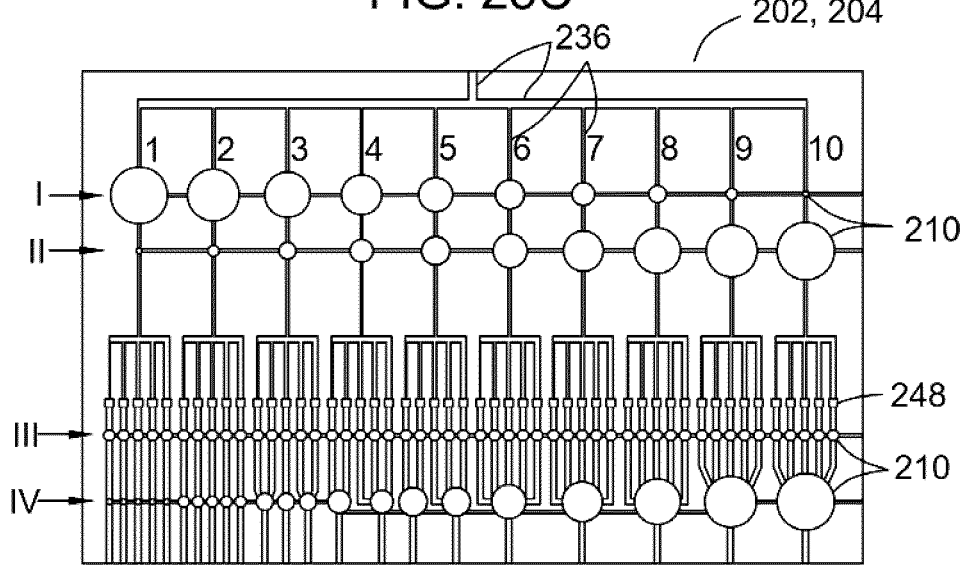
Figure 24A:
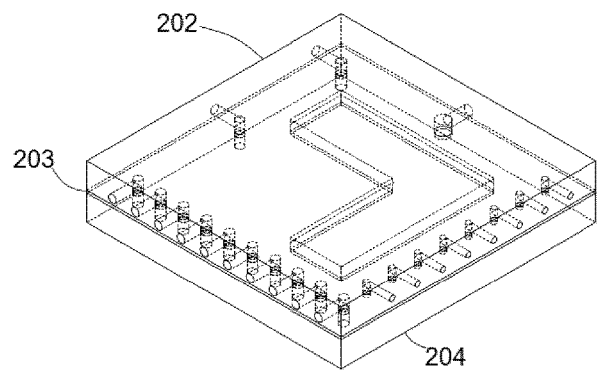
Figure 24B:
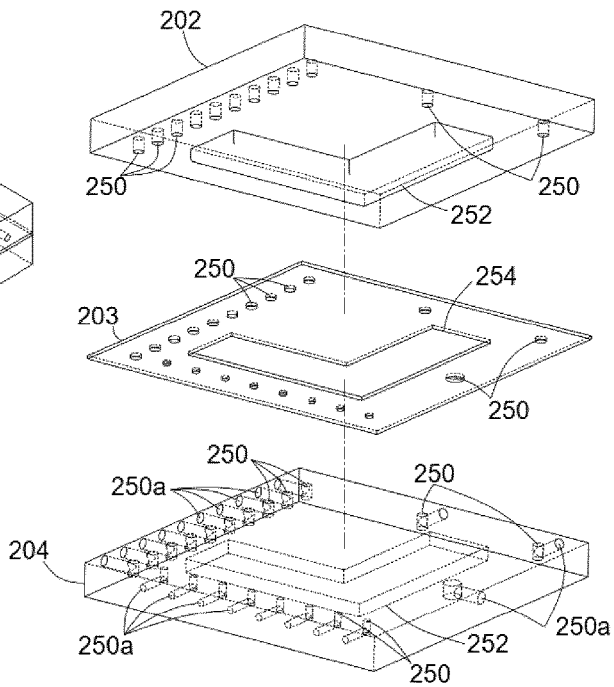
Figure 25A:
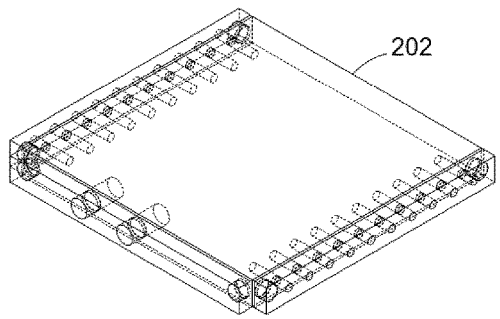
Figure 25B:
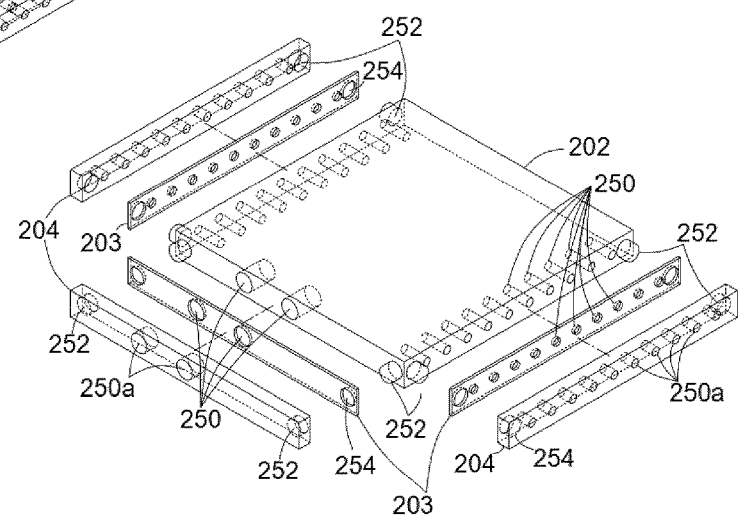
Figure 26A:
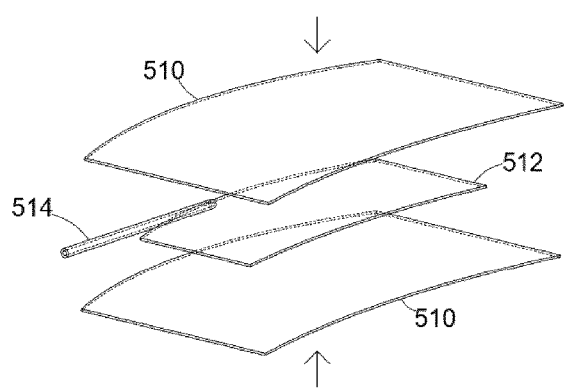
Figure 26B:
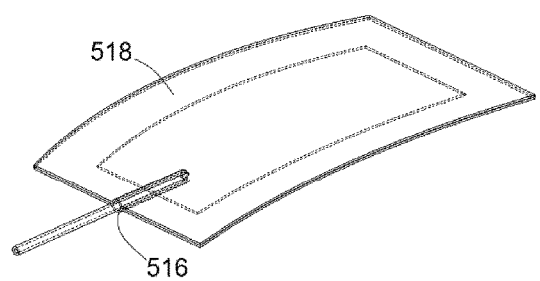
Figure 27A:
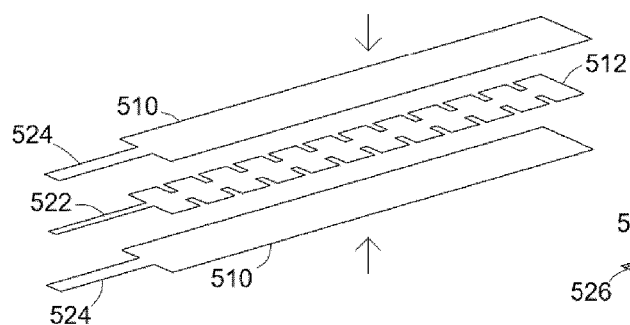
Figure 27B:
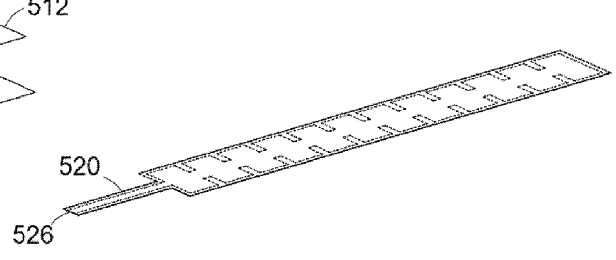
Figure 28:
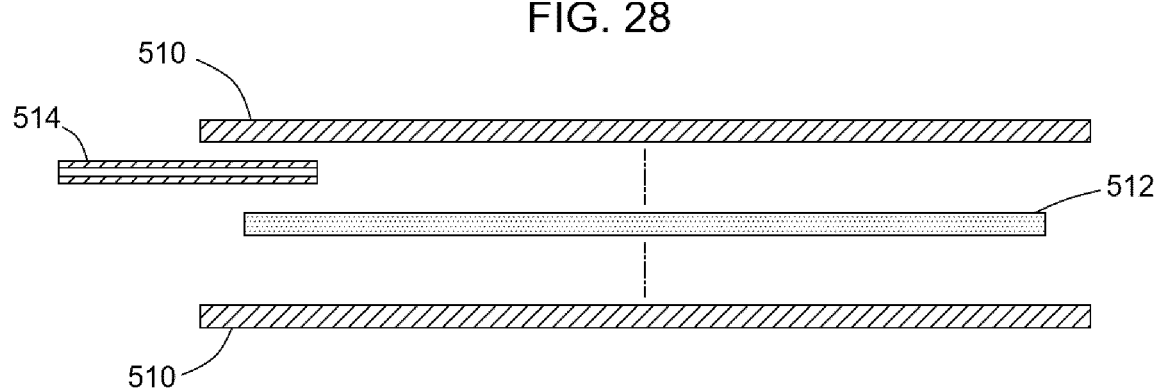
Figure 29:
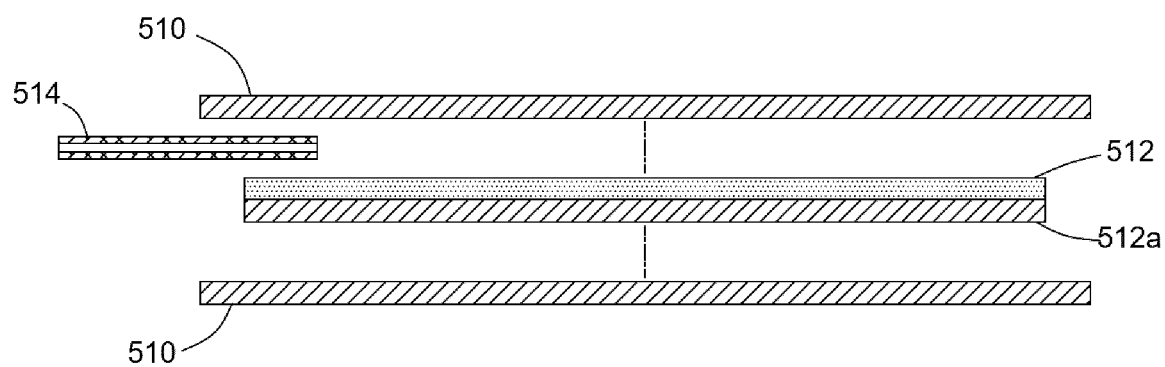
Figure 30:
Figure 31A:
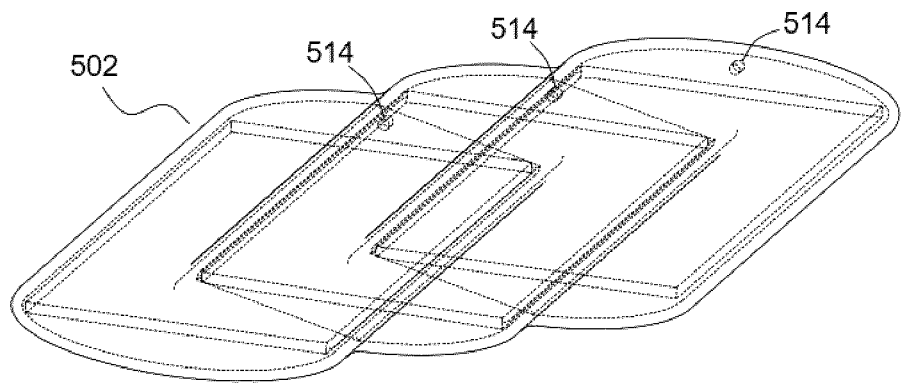
Figure 31B:
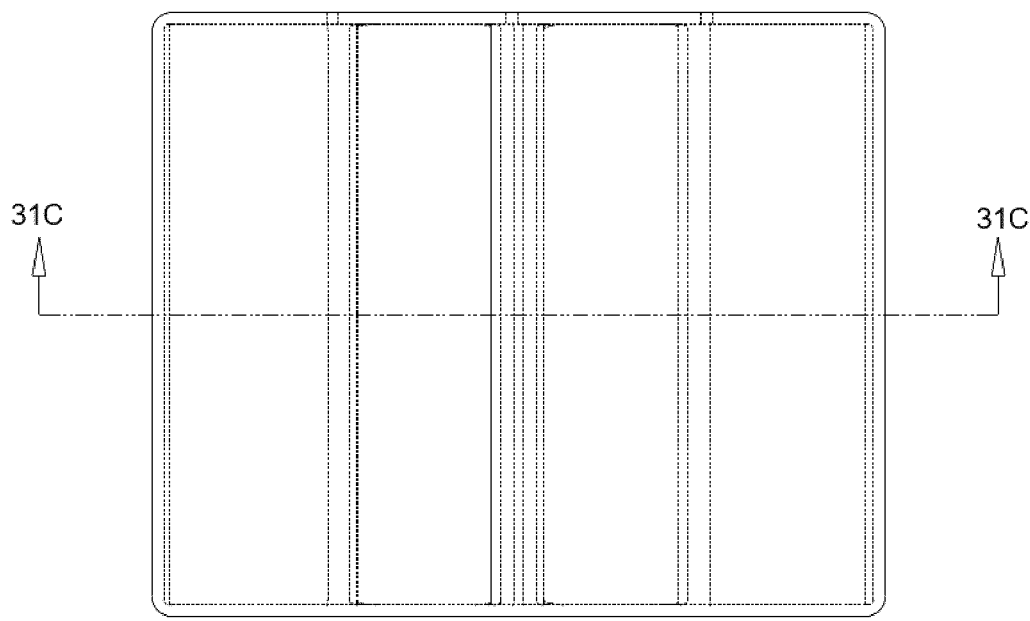
Figure 31C:
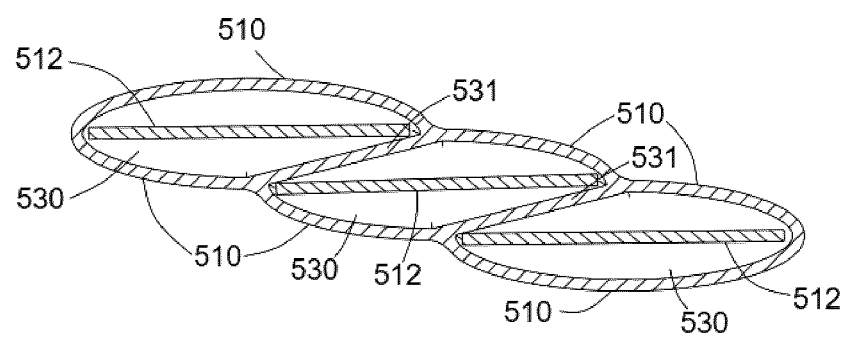
Figure 32A:
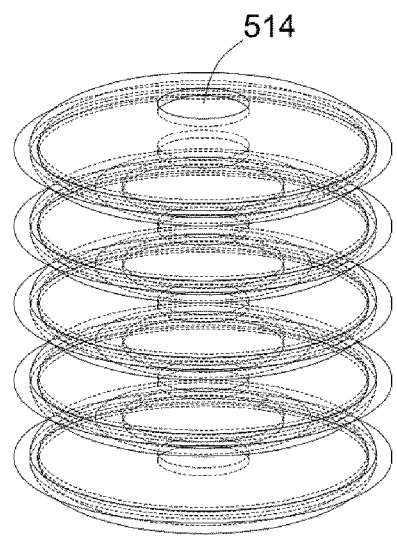
Figure 32B:
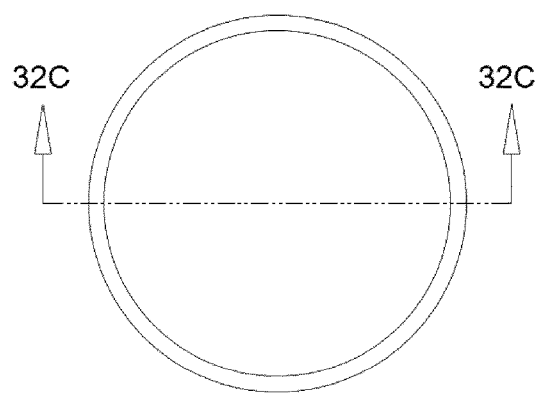
Figure 32C:
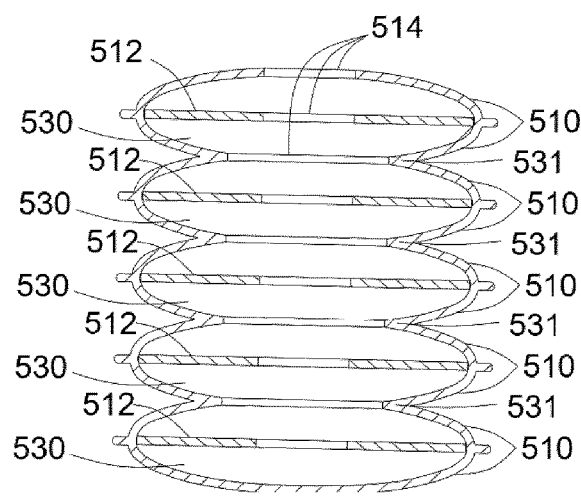
Figure 33A:
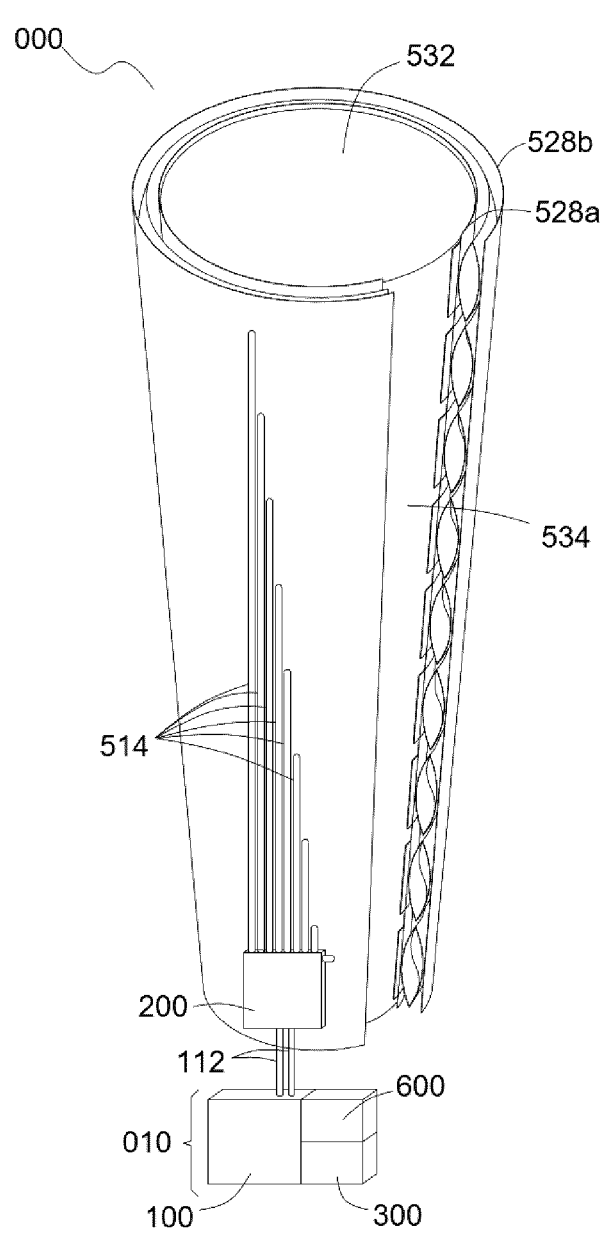
Figure 33B:
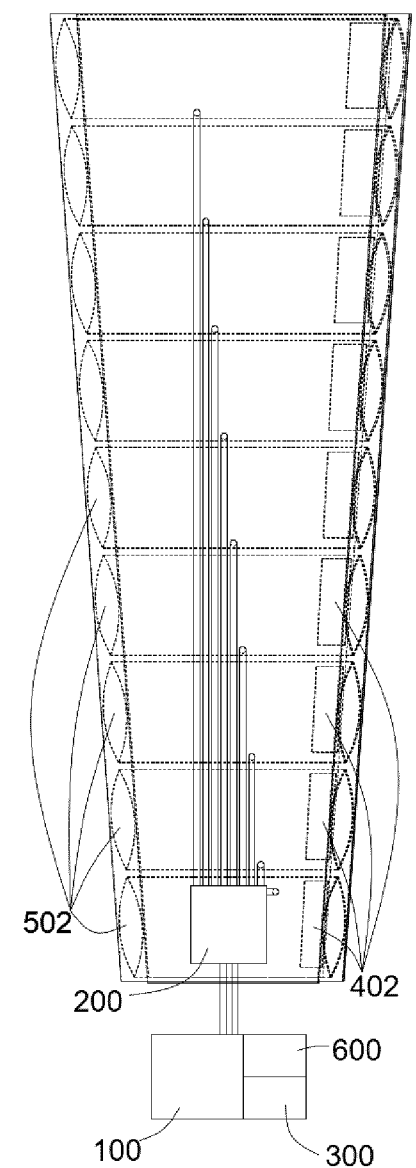
Figure 34:
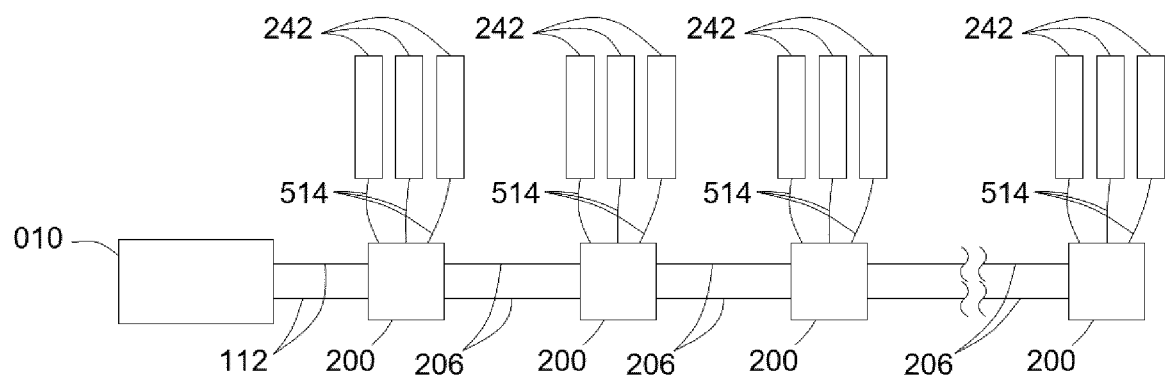

FIG. 2H to FIG. 2L are distinct and separate section views of the embodiment of the single on-chip pinch valve as seen in FIG. 2F; wherein each figure is showing the movements of the membrane layer's freestanding portion; the effect of the membrane layer's deflection, flexion and/or stretch on the flow of fluid through the on-chip pinch valve's valve pinch chamber; the small arrows depict the fluidic pressure exerted on the membrane, and the large arrow depicts the flow of fluid;

FIG. 3A is a perspective view of a double on-chip pinch valve in accordance with an embodiment of the present;

FIG. 3B is an exploded perspective view of the embodiment of the double on-chip pinch valve as seen in FIG. 3A;

FIG. 3C is a front exploded view of the embodiment of the double on-chip pinch valve as seen in FIG. 3A;

FIG. 3D is a section view of the embodiment of the double on-chip pinch valve as seen in FIG. 3C;

FIG. 4A is a perspective view of a single on-chip pinch valve with a plurality of different fluid connection channels connecting to the valve control pressure chamber and the valve pinch chamber in accordance with one embodiment of the present invention;

FIG. 4B is a front view of the embodiment of the single on-chip pinch valve with a plurality of different fluid connection channels connecting to the valve control pressure chamber and the valve pinch chamber as seen in FIG. 4A;

FIG. 4C is an exploded perspective view of the embodiment of the single on-chip pinch valve with a plurality of different fluid connection channels connecting to the valve control pressure chamber and the valve pinch chamber as seen in FIG. 4A;

FIG. 5A is a perspective view of a single on-chip pinch valve demonstrating the effect of enlarging or reducing the size and/or effective surface area of the opening to the valve pinch chamber in accordance with an embodiment of the present invention;

FIG. 5B is a front view of the embodiment of the single on-chip pinch valve demonstrating the effect of enlarging or reducing the size and/or effective surface area of the opening to the valve pinch chamber as seen in FIG. 5A;

FIG. 5C is a section view of the embodiment of the single on-chip pinch valve demonstrating the effect of enlarging or reducing the size and/or effective surface area of the opening to the valve pinch chamber as seen in FIG. 5B;

FIG. 6 is an exploded perspective view of a single on-chip pinch valve demonstrating that the valve pinch chamber and valve control pressure chamber may be of any size, shape, orientation, volume, dimension and general physical form factor in accordance with an embodiment of the present invention;

FIG. 7A is a perspective view of a single on-chip pinch valve demonstrating the interaction and connection with microfluidic channels and minifluidic channels in accordance with an embodiment of the present invention;

FIG. 7B is a front view of the embodiment of the single on-chip pinch valve demonstrating the interaction and connection with microfluidic channels and minifluidic channels as seen in FIG. 7A;

FIG. 7C is a section view of the embodiment of the single on-chip pinch valve demonstrating the interaction and connection with microfluidic channels and minifluidic channels as seen in FIG. 7B;

FIG. 8A is a perspective view of a single on-chip pinch valve demonstrating the interaction with a plurality of microfluidic and minifluidic channels of different physical form factors in accordance with an embodiment of the present invention;

FIG. 8B is an exploded perspective view of the embodiment of the single on-chip pinch valve demonstrating the interaction with a plurality of microfluidic and minifluidic channels of different physical form factors as seen in FIG. 8A;

FIG. 9A is a perspective view of a fluidic chip in accordance with an embodiment of the present invention;

FIG. 9B is a front view of the embodiment of the fluidic chip as seen in FIG. 9A;

FIG. 9C is a section view of the embodiment of the fluidic chip as seen in FIG. 9B;

FIG. 10A is a perspective view of a fluidic chip in accordance with another embodiment of the present invention;

FIG. 10B is a top view of the embodiment of the fluidic chip as seen in FIG. 10A;

FIG. 11A is a perspective view of a fluidic chip in accordance with yet another embodiment of the present invention;

FIG. 11B is a top view of the embodiment of the fluidic chip as seen in FIG. 11A;

FIG. 12A is a perspective view of a fluidic chip in accordance with yet another embodiment of the present invention;

FIG. 12B is a top view of the embodiment of the fluidic chip as seen in FIG. 12A;

FIG. 13A is a perspective view of a plurality of fluidic chips fluidly connected together in series in accordance with an embodiment of the present invention;

FIG. 13B is a front view of the embodiment of the plurality of fluidic chips fluidly connected in series as seen in FIG. 13A;

FIG. 13C is a top view of the embodiment of the plurality of fluidic chips fluidly connected together in series as seen in FIG. 13A;

FIG. 14 is a schematic block diagram of the fluidic components in accordance with an exemplary embodiment of the present invention;

FIG. 15 is an illustration depicting the symbol for the fluidic resistor, fluidic capacitor and on-chip pinch valves for FIG. 16 to FIG. 22;

FIG. 16 to FIG. 22 are schematics showing fluidic resistance, on-chip pinch valve and fluidic capacitance network layouts in accordance with the present invention;

FIG. 23A is a schematic view of a fluidic chip in accordance with an embodiment of the present invention;

FIG. 23B is a schematic view of a fluidic chip in accordance with another embodiment of the present invention;

FIG. 23C is a schematic view of a fluidic chip in accordance with yet another embodiment of the present invention;

FIG. 24A is a perspective view of a microfluidic and minifluidic chip connected to a microfluidic and minifluidic chip socket in accordance with an embodiment of the present invention;

FIG. 24B is an exploded perspective view of the embodiment of the microfluidic and minifluidic chip connected to the microfluidic and minifluidic chip socket as seen in FIG. 24A;

FIG. 25A is a perspective view of a microfluidic and minifluidic chip connected to a microfluidic and minifluidic chip socket in accordance with another embodiment of the present invention;

FIG. 25B is an exploded perspective view of the embodiment of the microfluidic and minifluidic chip connected to a microfluidic and minifluidic chip socket as seen in FIG. 25A;

FIG. 26A is a perspective view showing a soft fluidic actuator and a method of fabricating soft fluidic actuators in accordance with the present invention; wherein the components are separated, and the arrows represent the direction of energy and/or force applied for bonding;

FIG. 26B is a perspective view showing a soft fluidic actuator and a method of fabricating soft fluidic actuators in accordance with the present invention; wherein the components are assembled and bonded;

FIG. 27A is a perspective view showing another soft fluidic actuator and an alternate method of fabricating soft fluidic actuators in accordance with the present invention; wherein the components are separated, and the arrows represent the direction energy and/or force applied for bonding;

FIG. 27B is a perspective view showing another soft fluidic actuator and an alternate method of fabricating soft fluidic actuators in accordance with the present invention; wherein the components are assembled and bonded;

FIG. 28 to FIG. 30 are sectional layered schematic views of soft fluidic actuators during fabrication in accordance with the present invention;

FIG. 31A is a perspective view of a plurality of overlapping independent soft fluidic actuators for providing compression created via the fabrication method in accordance with the present invention;

FIG. 31B is a top view of the plurality of overlapping independent soft fluidic actuators for providing compression as seen in FIG. 31A;

FIG. 31C is a section view of the plurality of overlapping independent soft fluidic actuators for providing compression as seen in FIG. 31B;

FIG. 32A is a perspective view of a plurality of overlapping interconnected soft fluidic actuators for providing torque, motion, force, and/or compression created via the fabrication method in accordance with the present invention;

FIG. 32B is a top view of the plurality of overlapping interconnected soft fluidic actuators for providing torque, motion, force, and/or compression as seen in FIG. 32A;

FIG. 32C is a section view of the plurality of overlapping interconnected soft fluidic actuators for providing torque, motion, force, and/or compression as seen in FIG. 32B;

FIG. 33A is a perspective view of a soft robotic system in the form of active compression apparel enabled by the invention described herein;

FIG. 33B is a side view of the soft robotic system in the form of active compression apparel as seen in FIG. 33A;

FIG. 34 is a schematic view of a soft robotic system with a plurality of fluidic chips and soft fluidic actuators in accordance with the present invention;

It is to be understood that the accompanying drawings are used for illustrating the principles of the embodiments and exemplifications of the invention discussed below. Hence the drawings are illustrated for simplicity and clarity, and not necessarily drawn to scale and are not intended to be limiting in scope. Reference characters/numbers are used to depict the elements of the invention discussed that are also shown in the drawings. The same corresponding reference characters/numbers are given to a corresponding component or components of the same or similar nature, which may be depicted in multiple drawings for clarity. Text may also be included in the drawings to further clarify certain principles or elements of the invention. It should be noted that features depicted by one drawing may be used in conjunction with or within other drawings or substitute features of other drawings. It should further be noted that common and well-understood elements for creating a commercially viable version of the embodiments of the invention discussed below are often not depicted to facilitate a better view of the principles and elements of the invention discussed below.

DETAILED DESCRIPTION OF PREFERRED EMBODIMENTS

In the following discussion, the accompanying figures pertain to the preferred embodiments, and the description is not intended to limit the scope, applicability or configuration of the invention as described by the claims. The description enclosed herein aims to provide any person skilled in the art the necessary information for the implementation of the preferred embodiments of the invention described herein.

Below is some clarification for certain terminologies; it must be noted that the clarifications do not limit the scope of the meaning of the terminologies in the context of the relevant art, and the invention described herein.

"Minifluidic channel" has cross-sectional characteristic lengths from and including but not limited to 10 mm to 200 µm; "microfluidic channel" have cross-sectional characteristic lengths from and including but not limited to 200 µm to 0.1 µm. It must be noted that the fluidic channel classification scheme is arbitrary and is used for clarity while not limiting the scope of any embodiments of the invention disclosed herein.

"Anatomical portion" comprises the meaning of any part of the human body, including but not limited to body joints and limbs.

"Soft fluidic actuators" and "fluidic capacitors" may be used interchangeably unless explicitly stated otherwise.

"soft robots" and "device" may be used interchangeable unless explicitly stated otherwise.

Singular forms including but not limited to "a" and "an", may also comprise the meaning of plural forms as well, unless explicitly stated otherwise.

Additionally, plural forms may also comprise the meaning of singular forms, unless explicitly state otherwise.

i. System Overview

Figure 1:
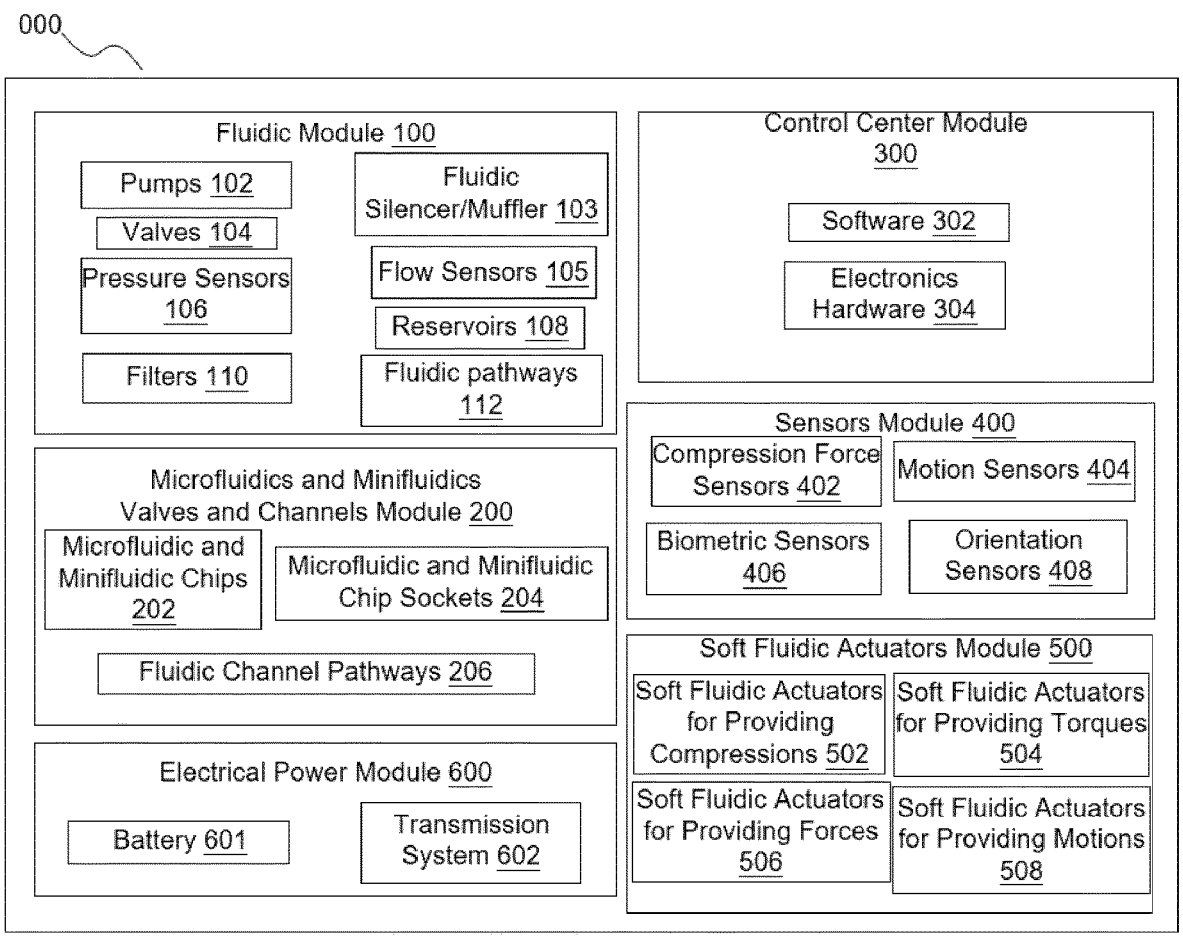
FIG. 1 is a diagram depicting the major modules as well as subcomponents of each major module of the present invention.

Microfluidics valves and channels and minifluidic valves and channels enabled soft robotic devices and apparel, which will be coined as the overall system, comprises of numerous hardware and software components. FIG. 1 shows the major modules that make up the overall system 000. The major modules are as follows: the fluidic module 100, the microfluidics and minifluidics valves and channels module 200, the control center module 300, sensors module 400, soft fluidic actuators module 500, and the electrical power module 600. Each major module comprises of various subcomponents.

The fluidic module 100 generates fluidic flow and/or pressure to and/or from the microfluidics and minifluidics valve and channels module 200 and/or the soft fluidic actuators module 500. The fluidic module 100 comprises one or more of the following subcomponents in various quantities: pumps 102, fluidic silencer/mufflers 103, valves 104, flow sensors 105, pressure sensors 106, reservoirs 108, filters 110, fluidic pathways 112 connecting any subcomponents of the fluidic module 100 and/or any other major module and/or any subcomponents of any other major module. The fluidic module 100 may further have or be connected in fluidic communication with one or more fluid intakes/entrances 111 (shown in FIG. 14) for receiving pressurized or unpressurized fluid by fluidic connection from an external source of pressurized or unpressurized fluid (not shown). The fluidic module 100 may further have or be connected in fluid communication with one or more fluid exhausts (shown in FIG. 14, in some embodiments exhaust ports 244 shown in FIGS. 16-18 & 20-22) for releasing or exhausting pressurized or unpressurized fluid.

Microfluidics and minifluidics valves and channels module 200, which will be abbreviated to MMVC module, enables any combination of sequential, gradient, uniform, pulsating, combinational, and/or individual actuation control of an array, a set, a single and/or a plurality of soft fluidic actuators. The control is in the form of inflation via fluidic flow and pressure, deflation via fluidic flow and pressure, and/or fluidic pressure holding. MMVC module 200 comprises one or more of the following subcomponents in various quantities: microfluidic and minifluidic chips 202, microfluidic and minifluidic chip sockets 204, and fluidic channel pathways 206 connecting any subcomponents of the MMVC module 200 and/or any other major module and/or any subcomponents of any other major module.

Control center module 300 is tasked with controlling the flow rate, flow direction, and/or pressure supplied by the fluidic module 100. The control center module 300 is also tasked with receiving, analyzing, and interpreting information from various sensors. The control center module comprises software 302 and electronics hardware 304 responsible for every aspect of the overall system 000, which includes but is not limited to the function of soft fluidic actuators, the function of the sensors, user experience, user interface, electronic communications, and/or electrical powers distribution. The control center 300 may also comprise any common and well-understood elements that would be necessary or desirable to produce a commercially viable control center 300 for the overall system 000; these elements include but are not limited to a motherboard, central processing unit (CPU), data storage in the form of solid-state drives (SSD), wireless network systems, random access memory (RAM), various electrical subcomponents such as electrical resistors, capacitors, diodes, fuses, and various electronic subcomponents such as field-effective transistors and any other types of silicon transistors.

The sensors module 400 enables various control schemes of the soft fluidic actuators and/or various user experience features. The sensors module 400 comprises of any number and/or any combination of the following: compression force sensors 402, motion sensors 404, biometric sensors 406, orientation sensors 408 and/or any other type of sensors necessary or desirable to produce a commercially viable versions of the overall system 000.

The soft fluidic actuators module 500 provides pressures, forces, and torques of various kinds and intensity levels to an anatomical portion of the human body or portions of the soft robotic device and/or apparel. The soft fluidic actuators module 500 may include one or more soft fluidic actuators of various functions, shapes, sizes, and/or volumes. The soft fluidic actuators module 500 comprises any combination and number of soft fluidic actuators for providing compressions 502, soft fluidic actuators for providing torques 504, soft fluidic actuators for providing forces 506, and/or soft fluidic actuators for providing motions 508.

The electrical power module 600 provides electrical power to all the major modules and their subcomponents of the overall system 000. The electrical power module 600 may comprise at least one battery 601 and at least one electrical power transmission system 602. The electrical power module 600 may also comprise any common and well-understood elements necessary or desirable to produce a commercially viable electrical power module. In some instances, the at least one battery 601 may be neglected and not included in the electrical power module 600. In some instances, the electrical power module 600 may not provide electrical power to certain major modules and/or their subcomponents. The at least one battery may be rechargeable and/or replaceable.

Any and all of the major modules and/or their subcomponents presented herein may be combined together as one element and/or container or separated into multiple elements and/or containers. Any container enclosing any module and/or their subcomponents may preferably, but need not necessarily, be elastic, flexible, rigid, or any combination thereof. Any and all of the major modules and/or their subcomponents presented herein may be integrated with the soft robot in selectively removable relation.

Various embodiments and exemplifications of the present invention are not limited by the major modules and their subcomponents mentioned; additional major modules and any sub-components to any above-mentioned major modules may be added to the overall system 000 to produce commercially-viable versions of the invention described herein. Also, one or more of the above-mentioned major modules and any subcomponents to any above-mentioned major modules may be removed from the overall system 000 to produce commercially viable versions of the invention described herein.

The microfluidic and minifluidic chip 202 comprises three major functional elements: the microfluidic channels, minifluidic channels, and on-chip fluidic pressure-controlled pinch valves. The on-chip fluidic pressure controlled pinch valve is abbreviated to the on-chip pinch valve. The microfluidic channels, minifluidic channels, and on-chip pinch valve work in unison and/or individually to enable any combination of sequential, gradient, uniform, pulsating, combinational, and/or individual actuation control of an array, set, a single and/or a plurality of soft fluidic actuators. Below, the individual functions of the three major components are explained in detail.

Each of the three major functional elements will first be separately demonstrated in detail below:

ii. On-Chip Pinch Valve

Figure 2G:
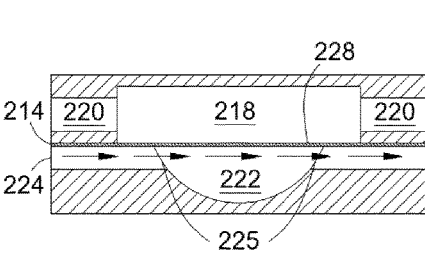
FIG. 2G is a section view of the embodiment of the single on-chip pinch valve as seen in FIG. 2F; wherein the figure is showing the flow of fluid depicted by the arrows through the valve pinch chamber.

An embodiment of a single on-chip pinch valve 210 is demonstrated in FIG. 2A to 2L from different views. FIG. 2A is a perspective view of the embodiment when all three main sub-elements of the on-chip pinch valve are fully integrated. The construction of an on-chip pinch valve is also shown in the exploded perspective views (FIG. 2B and FIG. 2C) as well as an exploded front view (FIG. 2D), and a section view (FIG. 2E). FIG. 2F is a front view of FIG. 2A, and FIG. 2G is a section view from FIG. 2F. The on-chip pinch valve 210 may be manufactured using any fabrication process including but not limited to soft lithography, replica molding, injection molding, additive manufacturing, subtractive manufacturing, 3D printing or any combination thereof. The on-chip pinch 210 valve may be constructed from any material and/or composite material including but not limited to polydimethylsiloxane (PDMS), plastics, elastomers, silicone, metals, glass, carbon fibers, semiconductors or any combination thereof.

The three main sub-elements are the valve control layer 212, the membrane layer 214, and the valve pinch layer 216. The valve control layer 212 comprises of a control pressure chamber 218 and multiple fluid connection channels 220 that serve as fluid flow inlets and/or outlets. The valve pinch layer 216 comprises a valve pinch chamber 222 and multiple fluid connection channels 224 that serve as fluid flow inlets and/or outlets. Openings 225 allow fluid to flow from the fluid connection channels 224 into the valve pinch chamber 222.

The membrane layer 214 is elastic and/or flexible. It is located in-between the valve control layer 212 and the valve pinch layer 216. As seen in FIG. 2C, FIG. 2D, and FIG. 2E, the valve control layer 212 and the valve pinch layer 216 permanently or semi-permanently bond to the membrane layer 214 at certain surface locations, forming at least one seal 226 where fluid may not cross over from the control pressure chamber 218 to the valve pinch chamber 222 and vice-versa. The portion on the membrane layer 214 where no bonding occurs between the aforementioned layers becomes freestanding 228 and may be flexed, deflected and/or stretched when pressure and/or force is applied. Generally, the bonding surface forms at least one fluid-tight seal 226 surrounding and encloses the freestanding portion of membrane layer 214. When bonded, the surfaces of the membrane layer 214 becomes at least one of the walls of the valve control pressure chamber 218 and at least one of the walls of the valve pinch chamber 222, effectively making each chamber 218, 222 fully enclosed with only fluid connection channels 220, 224 entering or existing the two chambers 218, 222. The membrane layer 214 may be of any material, composite material, shape, thickness, size, and/or any physical characteristics.

When the fluidic pressure inside the control pressure chamber 218 equals the fluidic pressure inside the valve pinch chamber 222 and/or at least one fluid connection channel 224 as seen in FIG. 2G, the membrane layer's freestanding portion 228 stays static and straight and does not impede the fluid flow pathway represented by the arrows through valve pinch chamber 222. In other words, fluid may enter the valve pinch chamber from at least one of the fluid connection channels 224 and exit through at least one other connection channel 224 with no added restriction caused by the movement of the membrane layer's freestanding portion 228. Also, the effective surface area of the opening 225 between a fluid connection channel and the valve pinch chamber is unchanged. The effective surface area of the opening 225 may enlarge or shrink based on the deflection, stretch, and/or flexion of the membrane layer's freestanding portion 228.

FIG. 2H to FIG. 2L are separate views of FIG. 2G showing the effect of movements of the membrane layer's freestanding portion 228. The movement, or more specifically, the deflection, stretch and/or flexion of the membrane layer's freestanding portion 228 can be viewed in 3-dimension in FIG. 2C. The deflection, stretch, and/or flexion of the membrane layer's freestanding portion 228 caused by the imbalance between the fluidic pressure within the control pressure chamber 218 and the fluidic pressure within the valve pinch chamber 222 and/or at least one fluid connection channel 224. Valve pinch chamber 222 and/or at least one fluid connection channel 224 will be denoted as "valve fluidic flow side 222, 224" hereon when describing pressure imbalances.

Figure 2H:
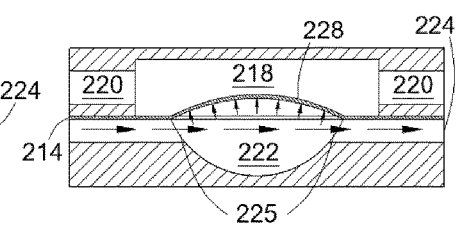
FIG. 2A is a perspective view of a single on-chip pinch valve in accordance with an embodiment of the present.
FIG. 2B is an exploded perspective view of the embodiment of the single on-chip pinch valve as seen in FIG. 2A when the membrane layer is not deflected, flexed, and/or stretched.
FIG. 2C is an exploded perspective view of the embodiment of the single on-chip pinch valve as seen in FIG. 2A when the membrane layer is deflected, flexed and/or stretched.
FIG. 2D is a front exploded view of the embodiment of the single on-chip pinch valve as seen in FIG. 2A when the membrane layer is deflected, flexed and/or stretched.
FIG. 2E is a section view of the embodiment of the single on-chip pinch valve as seen in FIG. 2D.
Figure 2I:
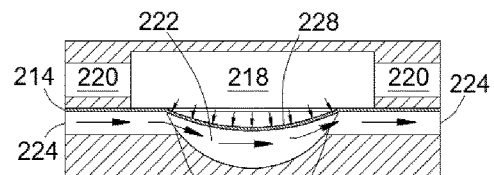
Figure 2J:
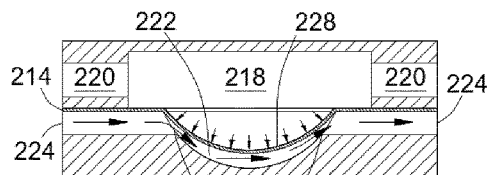
Figure 2K:
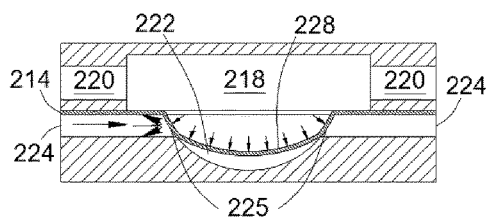

If the fluidic pressure within the valve fluidic flow side 222, 224 is larger than the pressure within the control pressure chamber 218, the freestanding portion 228 of the membrane layer 214 may deflect, stretch and/or flex into the control pressure chamber 218 as seen in FIG. 2H. The small arrows show that the pressure is forcing the membrane layer's freestanding portion 228 to flex, stretch, and/or deflect into the valve control pressure chamber 218. The fluid flow pathway may remain unobstructed as represented by the larger arrows. Also, the effective surface area of the opening 225 between a fluid connection channel and the valve pinch chamber may not become smaller and may become larger.

Figure 2L:
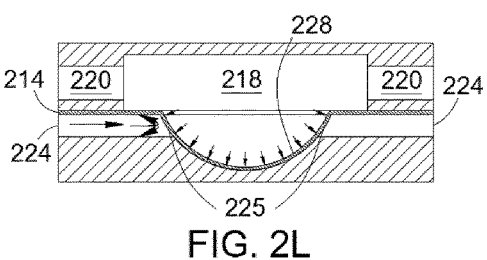

If the fluidic pressure within the valve fluidic flow side 222, 224 is smaller than the fluidic pressure within the control pressure chamber 218, the freestanding portion 228 of the membrane layer 214 may deflect, stretch and/or flex into the valve pinch chamber 218 as seen in FIG. 2I, FIG. 2J, FIG. 2K, and FIG. 2L. The higher the fluidic pressure difference between the valve fluidic flow side 222, 224 and the valve control pressure chamber 218, the more the deflection of the membrane layer's freestanding portion 228 into the valve pinch chamber 222, and the smaller the effective surface area of the opening 225 between a fluid connection channel 224 and the valve pinch chamber 222 becomes, and may increasingly impede and decrease the fluid flow through the valve pinch chamber 222 as represented by the larger arrows. Eventually, the fluidic pressure difference between the control pressure chamber 218 and the valve fluidic flow side 222, 224 may become large enough to deflect the membrane layer's freestanding portion 228 to fully block at least one opening 225, thus stopping at least one fluidic flow through the valve pinch chamber 222 as represented by the larger arrow in FIG. 2K. It must be noted that the freestanding portion 228 of the membrane layer may not need to fully or even partially contact the walls of the valve pinch chamber 222 to fully close at least one opening 225. Further increasing the fluidic pressure difference between the valve fluidic flow side 222, 224 and the valve control pressure chamber 218 may eventually cause the freestanding portion 228 to fully contact at least one wall of the valve pinch chamber 222 as seen in FIG. 2L.

As the fluidic pressure difference between valve pinch chamber 222 and the valve control pressure chamber 218 becomes increasingly smaller, at least one opening 225 may gradually open up, permitting at least one increasing fluidic flow through the valve pinch chamber 222.

An embodiment of a double on-chip pinch valve 210a is demonstrated in FIG. 3A to FIG. 3D. The double on-chip pinch valve 210a differs from a single on-chip pinch valve 210 as a single valve control pressure chamber 218 may simultaneously control two sets of valve pinch chambers 222 and membrane layers 214. The double on-chip pinch valve 210 may be created by bonding two valve pinch layers 216, two membrane layers 214, and one valve control layer 212 in the fashion and/or orientation shown in the exploded view of FIG. 3B. In other words, a double on-chip pinch valve 210a has five layers instead of the three layers of the single on-chip pinch valve 210.

For a double on-chip pinch valve 210a (FIG. 3A to FIG. 3D), the valve control layer 212, when bonded to the two membrane layers 214, allows the difference in fluidic pressure between the two chambers 218, 222 to deflect, stretch and/or flex freestanding portions 228 of the two membrane layers 214. Each of the valves of a double on-chip pinch valve 210a functions the same as a single on-chip pinch valve 210. It must be noted that a single valve control pressure chamber 218 may simultaneously control any number of sets of valve pinch chambers 222 and membrane layers 214 without deviating from the present invention described herein. Also, any number and/or any combination and/or orientation of the three aforementioned layers 212, 214, 216 may be bonded to create any number of on-chip pinch valves without deviating from the present invention described herein. Moreover, this same concept may be applied to triple, quadruple, quintuple and/or any quantity of on-chip pinch valve with a single valve control pressure chamber 218 as long as there are enough surfaces to accommodate bonding of membrane layers 214 with the single valve control layer 212. Therefore, a single valve control pressure chamber 218 may control a plurality of membranes layers 214 and/or valve pinch chambers 222.

An embodiment of a single on-chip pinch valve 210 with 5 fluid connection channels 220, 220a, 220b, 220c for the valve control pressure chamber 218 and 5 fluid connection channels 224, 224a, 224b, 224c for the valve pinch chamber 222 is demonstrated in FIG. 4A, FIG. 4B and FIG. 4C. Two fluid connection channels 220 for the valve control pressure chamber 218 may be the same, whereas the other three fluid connection channels 220a, 220b, 220c may have different dimensions, size, cross-sectional area, length, route and/or any factors that may affect the connection channel's fluid flow or physical appearance. Two fluid connection channels 224 for the valve pinch chamber 222 may be the same, whereas the other three fluid connection channels 224a. 224b, 224c may have different dimensions, size, cross-sectional area, length, route and/or any factors that may affect the connection channel's fluid flow or physical appearance. The purpose of this embodiment is to showcase that any number of fluid connection channels may exist per single on-chip pinch valve, and any one of the fluid connection channels may be of any dimension, size, cross-sectional area, length, route and/or any factors that may affect the fluid connection channel's fluid flow or physical appearance. Also, any fluid connection channel may be connected to the valve control pressure chamber 218 and the valve pinch chamber 222 at any location, position, and/or orientation.

From FIG. 4A, FIG. 4B, and FIG. 4C, different fluid connection channels 224, 224a, 224b, 224c for the valve pinch chamber 222 may also correspond to different opening 225, 225a, 225b, 225c between a fluid connection channel and the valve pinch chamber. For instance, fluid connection channels 224 correspond to opening 225, and the letter following the reference number 224 and 225 represents a matching pair of fluidic connection channels and its opening to the valve pinch chamber which is clearly demonstrated in FIG. 4C. Different openings 225, 225a, 225b, 225c may have different fluid flow characteristics and different degrees of opening or closing due to the deflection, stretch, and/or flexion of the membrane layer 214 at different fluidic pressure differences between the valve control pressure chamber 218 and the valve pinch chamber 222 and/or valve fluidic flow side 222, 224. This is an important aspect of the invention disclosed herein, as a single on-chip pinch valve may have different fluidic flow rates under any fluidic pressure through at least two openings between a fluid connection channel and/or the valve pinch chamber 222 at any given time and/or condition. Any embodiment of a single on-chip pinch valve may have any number of openings between a fluid connection channel and the valve pinch chamber, and at least one of the openings between a fluid connection channel and the valve pinch chamber may differ from a second opening between a fluid connection channel and the valve pinch chamber in any physical form factors including but not limited to size, orientation, position and/or location on the valve pinch chamber.

An embodiment of a single on-chip pinch valve 210 is demonstrated in FIG. 5A, FIG. 5B, and FIG. 5C. The purpose of this embodiment is to show that the opening 225 between a fluid connection channel 224 and the valve pinch chamber 222 may be modified, including but not limited to enlarging or reducing the size and/or effective surface area of the opening 225, by reducing or enlarging the size of the fluid connection channel 224 at the opening 225 between a fluid connection channel 224 and the valve pinch chamber 222. FIG. 5C, as a non-limiting example, clearly shows a tapered surface 227 that reduces the size of the opening 225. This method may allow for any opening 225 regardless of the physical form factor of the fluid connection channel 224 to have different fluid flow characteristics and different degrees of opening or closing due to the deflection, stretch and/or flexion of the membrane layer 214 at different fluidic pressure differences between the valve control pressure chamber 218 and the valve pinch chamber 222 and/or valve fluidic flow side 222, 224.

An embodiment of a single on-chip valve 210 is demonstrated in FIG. 6. The purpose of this embodiment is to show that the valve control pressure chamber 218 and the valve pinch chamber 222 may be of any size, shape, orientation, volume, dimension and general physical form factor.

As a non-limiting constraint, any embodiment of the on-chip pinch valve may range in total volume (volume of valve pinch chamber and volume of valve control pressure chamber) from 0.1 cubic micrometer to 10,000 cubic centimeters. Any embodiment of the on-chip pinch valve may be constructed out of any material according to any full and/or partial aspects of the invention described herein.

iii. On-Chip Pinch Valve with Microfluidic Channels and/or Minifluidic Channels

The second and third major functional elements of the microfluidic and minifluidic chip 202 and/or the microfluidic and minifluidic chip socket 204 are the microfluidic channels and minifluidic channels. The definition and characterization of microfluidic channels and minifluidic channels are thoroughly identified and documented in WIPO patent application Ser. No. PCT/CA2020/050874 "AIR MICROFLUIDICS AND AIR MINIFLUIDICS ENABLED ACTIVE COMPRESSION DEVICE, APPAREL, AND METHOD" filed Jun. 24, 2019, by the same inventors as the disclosed technology herein and is incorporated herein by reference as if set forth in full.

Certain embodiments of the on-chip pinch valve 210 may interact with any number of microfluidic channels and minifluidic channels within the same microfluidic and minifluidic chip 202 that the on-chip pinch valve 210 resides on or any number of different microfluidic and minifluidic chips 202.

FIG. 7A, FIG. 7B, and FIG. 7C shows an embodiment of the interaction between a single on-chip pinch valve 210 with microfluidic channels 230 and minifluidic channels 232. The microfluidic channel 230 and/or minifluidic channel 232 may fluidly connect to the fluid connection channels 220, 224 of the on-chip pinch valve 210. Fluid may flow through the microfluidic channels 230 and/or minifluidic channels 232 into the fluid connection channels 220, 224 and then into the valve control pressure chamber 218 and/or valve pinch chamber 222 and exit through at least one other fluid connection channel 220, 224 and may continue exiting through at least one other microfluidic channel 230 and/or minifluidic channel 232. The microfluidic channel 230 and minifluidic channel 232 may be upstream or downstream of the on-chip pinch valve 210. In certain embodiments of the invention described herein, the microfluidic channels and minifluidic channels may become fluid connection channels and vice versa.

FIG. 8A and FIG. 8B shows an embodiment of the interaction between a single on-chip pinch valve 210 with multiple microfluidic channels 230, 230a, 230b, 230c, 230d and/or minifluidic channels 232, 232a, 232b, 232c, 232d per fluid connection channel 220, 224. The purpose of this embodiment is to show that microfluidic channels 230 and/or minifluidic channels 232 may have any shape, size, length, orientation, direction, route, style, and/or any physical form factor. For instance, the route of microfluidic channels and/or minifluidic channels may be straight 230, 232 and/or curved in the shape of a repeating serpentine 230a, 232b, 232d and/or completely random and/or irregular 230b. The cross-sectional shape of microfluidic channels and/or minifluidic channels include but are not limited to circular 230, square 232, rectangular 230a, slot 230d, and/or hexagon 230c. Any number of microfluidic channels 230 and/or minifluidic channels 232 may be fluidly connected to any number of fluid connection channels 220, 224.

iv. Fluidic Network

For certain embodiments of the invention described herein, a single on-chip pinch valve 210 may be a single microfluidic and minifluidics chip 202 and/or a single microfluidic and minifluidics chip socket 204. microfluidic and minifluidics chip 202 and/or microfluidic and minifluidics chip socket 204 will be denoted as "fluidic chip 202, 204" hereon unless explicitly state otherwise. For certain other embodiments, at least one single on-chip pinch valve 210 and at least one microfluidic channel 230 and/or minifluidic channel 232 are arranged in a fluidic network to form a fluidic chip 202, 204.

FIG. 9A, FIG. 9B, and FIG. 9C shows an embodiment of a fluidic chip 202, 204 where a plurality of on-chip pinch valves 210 are arranged side-by-side. Each of the ten on-chip pinch valves 210 have a different sized valve pinch chamber 222, 222a, 222b, 222c, 222d, 222e, 222f, 222g, 222h, 222i. Different sized valve pinch chambers may differ in ways, including but not limited to volume, shape, size, dimensions, and/or any physical characteristic. Each of the ten on-chip pinch valves 210 uses the same membrane layer 214 and the same valve control pressure chamber 218. Different sized valve pinch chamber 222 may allow the same membrane layer 214 under the same fluidic pressure difference between the valve fluidic flow side 222, 224 and valve control pressure chamber 218 to impede fluid flow differently through the valve pinch chamber 222. The fluid connection channels 224 from the on-chip pinch valve 210 may be interconnected in series and/or parallel in any combination and/or order. Each of the fluid connection channels 224 may connect to any number of microfluidic channels 230 and/or minifluidic channels 232. Fluid connection channels 220, 224 may be microfluidic channels and/or minifluidic channels. Fluid connection channels 220, 224 may fluidly connect and/or fluidly communicate with any fluidic components including but not limited to other fluidic chips 202, 204, soft fluidic actuators, pumps, valves, and/or fluidic module.

The importance of the embodiment of fluidic chip 202, 204 shown in FIG. 9A, FIG. 9B, and FIG. 9C is to show that any number of on-chip pinch valves 210 may exist on a single fluidic chip 202, 204. Also, any on-chip pinch valves 210 on a single fluidic chip 202 may be different or the same with any number of additional on-chip pinch valves 210 on the same fluidic chip 202. Also, any number of on-chip pinch valves 210 may use the same or different membrane layer 214. Different membrane layer 214 is defined by having different material properties, thickness, dimensions, size or any physical attributes and/or chemical properties. Also, any number of valve pinch chambers 222 may reside on the same or different valve pinch layers 216. Different valve pinch layers 216 are defined by having different material properties, thickness, dimensions, size or any physical attributes and/or chemical properties. Also, any number of valve control pressure chambers 218 may reside on the same or different valve control layers 212. Different valve control layers 212 are defined by having different material properties, thickness, dimensions, size or any physical attributes and/or chemical properties. Also, any number of on-chip pinch valves 210 may use the same or different valve control pressure chambers 218. Different valve control pressure chamber 218 means that they are not directly and/or indirectly fluidly connected. Any of these aspects may apply in whole and/or in part to any embodiment of the invention disclosed herein.

FIG. 10A and FIG. 10B shows an embodiment of a fluidic chip 202, 204 where a plurality of fluidic channels 234, 236 are combined with a plurality of fluidic chip connection points 238 and a plurality of the same and/or different on-chip pinch valves 210. Fluidic channels 234 connect to the valve control pressure chambers, and fluidic channels 236 connect to the valve pinch chambers. Any fluidic chip connection point 238 may be fluidly connecting any fluidic channels 234, 236 to various fluidic components, including but not limited to fluidic channel pathways, fluidic tubing, any number of additional fluidic chips, microfluidic and/or minifluidic chip sockets, electromechanical solenoid valves, active valves, pumps, soft fluidic actuators, pressure sensors, passive valves, check valves and/or ambient atmosphere. Any fluidic channels 234, 236 may connect any valve pinch chamber and/or any valve control pressure chamber. Fluidic channels 234, 236 may be microfluidic channels and/or minifluidic channels. Fluidic channels 234, 236 may be in any direction, location, and/or orientation; fluidic channels 234, 236 may have any physical characteristics and/or fluidic resistance characteristics, including but not limited to size, route, cross-sectional area, and/or dimension. Any fluidic channel 234, 236 may connect to any number of other fluidic channels 234, 236 in parallel and/or in series. Different sections of fluidic channels 234, 236 may have different physical characteristics and/or fluidic resistance.

FIG. 11A and FIG. 11b shows an embodiment of a fluidic chip 202, 204 where a serpentine-shaped fluidic channel 236a is fluidly connected to a plurality of other fluidic channels 236 leading to valve pinch chambers 222 of a plurality of on-chip pinch valves 210a, 210b that may be the same and/or different. This embodiment (FIG. 11) may use the serpentine-shaped fluidic channel 236a for sequential and gradient inflation of one or more soft fluidic actuators connected via fluidic pathways to one or more fluidic chip connection point 238. This embodiment (FIG. 11) may also use any number of on-chip pinch valves 210a, 210b for sequential inflation, uniform deflation, sequential deflation, and/or holding of pressure within one or more soft fluidic actuators. Any number of on-chip pinch valves 210a and on-chip pinch valves 210b may both completely close to hold the pressures within one or more soft fluidic actuators. Any number of on-chip valves 210a may sequential and/or uniformly open to allow sequential and/or uniform deflation of one or more soft fluidic actuators. Any number of on-chip valves 210b may sequential open for sequential inflation of one or more soft fluidic actuators. The opening of any on-chip valves 210a, 210b may open partially and/or completely. The serpentine-shaped fluidic channel 236a may be microfluidic channels and/or minifluidic channels. Sections of the serpentine-shaped fluidic channel 236a may have different physical characteristics and/or fluidic resistance characters, including but not limited to size, route, cross-sectional area, and/or dimension. Any number of fluidic channels 236 may connect to any number of valve pinch chambers. Any number of fluidic channels 234 may connect to any number of valve control pressure chambers. Any fluidic chip connection point 238 may be fluidly connecting any fluidic channels 234, 236 to various fluidic components, including but not limited to fluidic channel pathways, fluidic tubing, any number of additional fluidic chips, microfluidic and/or minifluidic chip sockets, electromechanical solenoid valves, active valves, pumps, soft fluidic actuators, pressure sensors, passive valves, check valves and/or ambient atmosphere.

FIG. 12A and FIG. 12B shows another embodiment of a fluidic chip 202, 204 with a plurality of on-chip pinch valves 210 connected fluidly in parallel. Each valve pinch chamber 222 has its individual valve control chamber 218. Each valve pinch chamber 222 may differ from at least one other valve pinch chamber 222 in ways including but not limited to volume, shape, size, dimensions, and/or any physical characteristic. Each valve control pressure chamber 218 may differ from at least one other valve control pressure chamber 218 in ways including but not limited to volume, shape, size, dimensions, and/or any physical characteristic. Any valve control pressure chamber 218 may be fluidly connected to at least one other valve control pressure chamber 218 via at least one fluidic channel 236. The fluidic channels 234 may be microfluidic channels and/or minifluidic channels. In certain other embodiments, a fluidic chip with a plurality of on-chip pinch valves may be connected fluidly in series. Any fluidic chip connection point 238 may be fluidly connecting any fluidic channels 234, 236 to various fluidic components, including but not limited to fluidic channel pathways, fluidic tubing, any number of additional fluidic chips, microfluidic and/or minifluidic chip sockets, electromechanical solenoid valves, active valves, pumps, soft fluidic actuators, pressure sensors, passive valves, check valves and/or ambient atmosphere.

FIG. 13A, FIG. 13B and FIG. 13C shows a plurality of fluidic chips 202, 204 fluidly connected together in series. Fluid flow may enter a first valve control pressure chamber 218 then flow into a subsequent valve control pressure chamber 218, and continue flowing to a plurality of additional valve control pressure chambers. Fluid flow may enter a first valve pinch chamber 222, then flow into a subsequent valve pinch chamber 222, and continue flowing to a plurality of additional valve pinch chambers. Each fluidic chip 202, 204 hosts at least one on-chip pinch valve 210. Fluidic channel pathways 206 interconnect the plurality of fluidic chips 202 by connecting to the fluidic chip connection points 238. The fluidic channel pathways 206 include but are not limited to tubing, piping, microfluidic channels and/or minifluidic channels embedded within at least one fluidic chip, and/or fluidic channels embedded within at least one microfluidic and minifluidic chip socket. In certain other embodiments, a fluidic chip with a plurality of on-chip pinch valves and/or fluidic chips may be connected fluidly in parallel.

FIG. 14 is a schematic depicting the possible flow directions of fluids and fluidic communications pathway between major modules and their subcomponents. The arrows depict non-limiting directions of fluid flow. Filters 110 within the fluidic module 100 may allow fluid to enter at least one fluidic pathway 112. The plurality of fluidic pathways 112 may interconnect each other in series and/or parallel and/or connect other subcomponents of the fluidic module 100 in series and/or parallel. These sub-components include but are not limited to pumps 102, fluidic silencers/mufflers 103, valves 104, flow sensors 105, pressure sensors 106, and/or reservoirs 108. At least one fluidic pathway 112 may connect with at least one fluidic channel pathway 206 within the MMVC module 200. The fluidic channel pathways 206 may allow fluid to flow to and/or from at least one fluidic chip 202 and/or at least one fluidic chip socket 204. Fluid may flow from at least one fluidic chip 202 to at least one fluidic chip socket 204. At least one fluidic channel pathway 206 may allow fluid flow to and/or from at least one fluidic chip 202 and/or at least one fluidic chip socket 204 to and/or from one or a plurality of soft fluidic actuators 502, 504, 506, 508. Any major modules, fluidic communication pathways and/or subcomponents may be moved and/or removed in any embodiments of the present invention without deviating from the invention described herein. For certain embodiments of the invention presented herein, any major modules, fluidic communication pathways and/or subcomponents may be moved to a new location and fluidly communicate with any other major modules, fluidic communication pathways and/or subcomponents without deviating from the invention described herein.

FIG. 15 is a legend showing the symbols for three main fluidic components that will be used in FIG. 16 to FIG. 22. Fluidic resistor 240 may be any number of microfluidic channels and/or minifluidic channels fluidly connected in series and/or parallel. Fluidic capacitor 242 may be any number of soft fluidic actuators 502, 504, 506, 508 fluidly connected in series and/or parallel. On-chip pinch valves 210 may be any number of on-chip pinch valves fluidly connected in series and/or parallel.

FIG. 16 to FIG. 22 are schematic drawings showing possible general fluidic layouts of various embodiments of the invention described herein. The solid straight lines connecting various fluidic components represent at least one fluidic channel which may be microfluidic channels and/or minifluidic channels with any physical characteristics. The box made of dotted lines encloses various sections of the general fluidic layouts. The numbers at the top represent fluidic channels leading to at least one fluidic capacitor. The numbers near the fluidic capacitors correspond to the fluidic channel's number. For instance, the fluidic capacitor with number 1 is fluidly connected in series and/or parallel to fluidic channels 1. The "n" can mean any number meaning that there may be n number of fluidic channels leading to n number of fluidic capacitors. The six and/or three solid circles placed horizontally side-by-side represent that there may be a plurality of fluidic channels up to n connecting to a plurality of corresponding fluidic capacitors up to n. The fluidic channels connected in parallel may represent fluidic channels connected in series and vice versa. A single fluidic resistor symbol 240 may represent a plurality of fluidic resistors, which applies to fluidic channels, fluidic capacitors 242, and on-chip pinch valves 210. Any fluidic resistor 240 may have any fluidic resistance value. Any fluidic capacitor 242 may have any fluidic capacitance value. Any on-chip pinch valves 210 may be of any embodiment and/or combination of various embodiments or various aspects of a plurality of embodiments described herein. The embodiments depicted by FIG. 16 to FIG. 22 are non-limiting examples where any sections of the general fluidic layout may be removed, added onto, and/or replaced with any other section(s) without deviating from the invention described herein.

Figure 16:
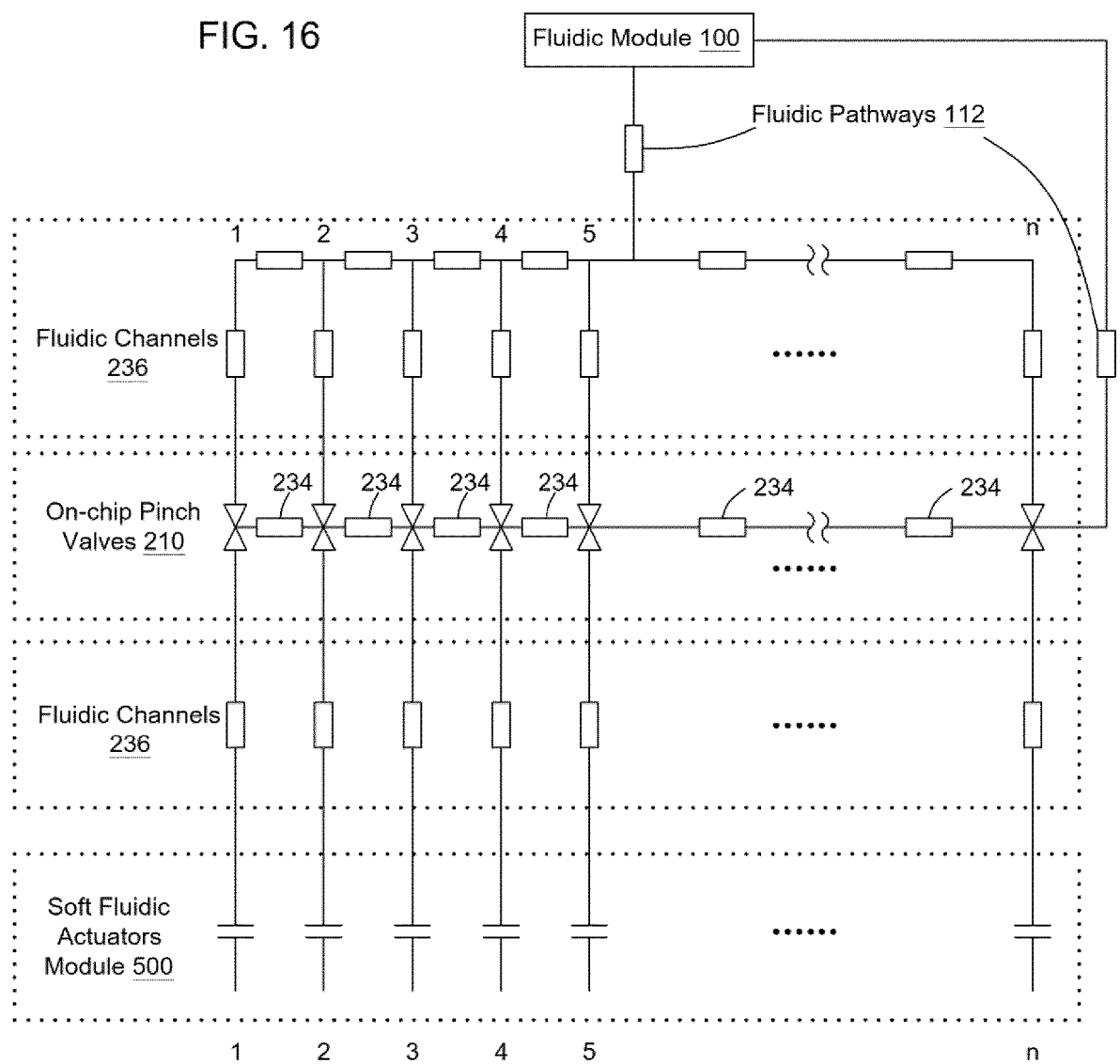

FIG. 16 has four sections: two fluidic channels 236 sections, one on-chip pinch valves 210 section and a soft fluidic actuators module 500 section. The soft fluidic actuators module 500 section is downstream from the other sections. An on-chip pinch valves 210 section is located fluidly in between the two fluidic channels 236 sections. At least one set of fluidic pathways 112 connects the fluidic module 100 with the fluidic channels 236 connecting to the valve pinch chambers. At least one set of fluidic pathways 112 connects to the fluidic channels 234 connecting to the valve control pressure chambers of the set of on-chip pinch valves 210.

Figure 17:
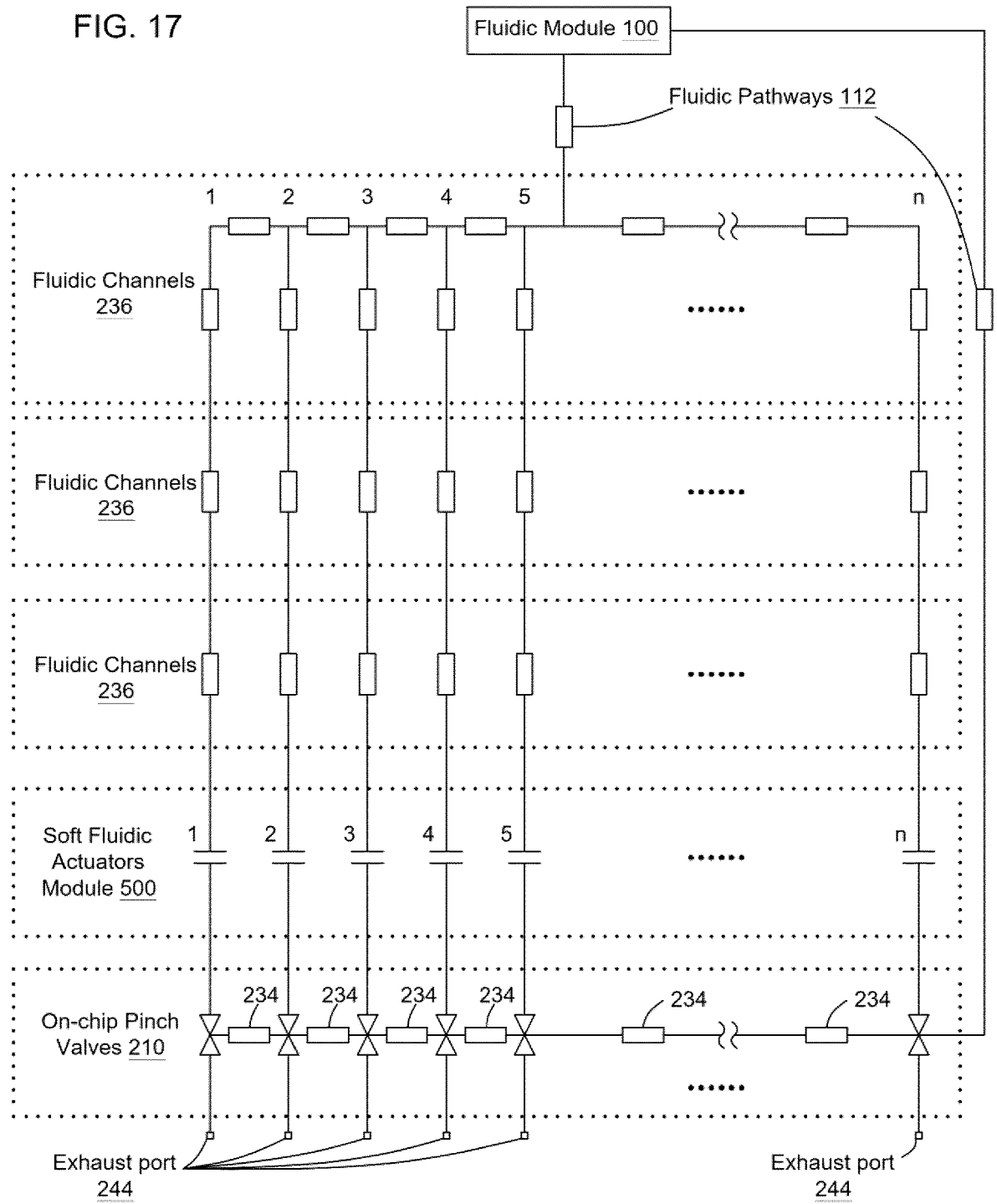

FIG. 17 has five sections: three fluidic channels 236 sections, one on-chip pinch valves 210 section and a soft fluidic actuators module 500 section. Fluidic module 100 connects to a first fluidic channels 236 section by a set of fluidic pathways 112. The first set of fluidic channels 236 connects to a second set of fluidic channels 236, and the second set of fluidic channels connects 236 to a third set of fluidic channels 236. The third set of fluidic channels 236 connects to a soft fluidic actuators module 500 section. The soft fluidic actuators module 500 section connects to a plurality of valve pinch chambers of a set of on-chip pinch valves 210 downstream. The plurality of valve pinch chambers of the set of on-chip pinch valves 210 connects to a plurality of exhaust ports 244 downstream. At least one set of fluidic pathways 112 connects to the fluidic channels 234 connecting to the valve control pressure chambers of the set of on-chip pinch valves 210. An important aspect of this schematic is to show that multiple different sections of fluidic channels 236 may be connected fluidly in series and/or parallel for any embodiments of the present invention. Another important aspect of this schematic is to show that for any embodiments of the present invention, a plurality of exhaust ports 244 may fluidly connect to the valve pinch chamber of at least one set of on-chip pinch valves 210. Any exhaust port 244 may fluidly connect to any number of fluidic components, including but not limited to tubing, fluidic chips, fluidic chip sockets, fluidic modules, valves, pumps, reservoirs, fluidic pathways, fluidic silencers/mufflers, flow sensors, pressure sensors, soft fluidic actuators, and/or the ambient atmosphere.

Figure 18:
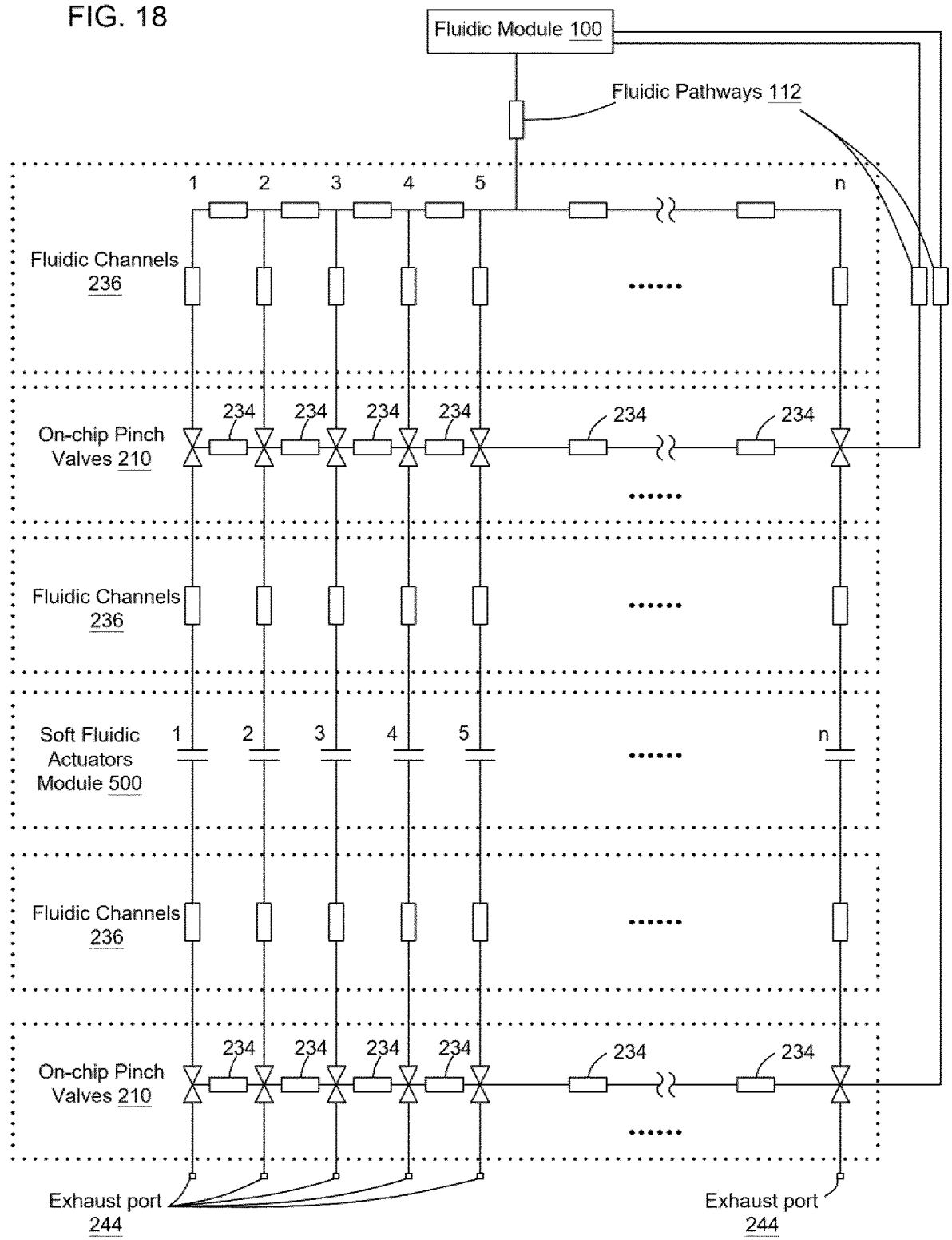

FIG. 18 has 6 sections: two fluidic channels 236 sections and an on-chip pinch valves 210 section upstream from a soft fluidic actuators module 500 section. A fluidic channels 236 section and an on-chip pinch valves 210 section are downstream from the soft fluidic actuators module 500 section. An important aspect of this schematic is to show that any section may be upstream and/or downstream from any other section for any embodiments of the present invention.

Figure 19:
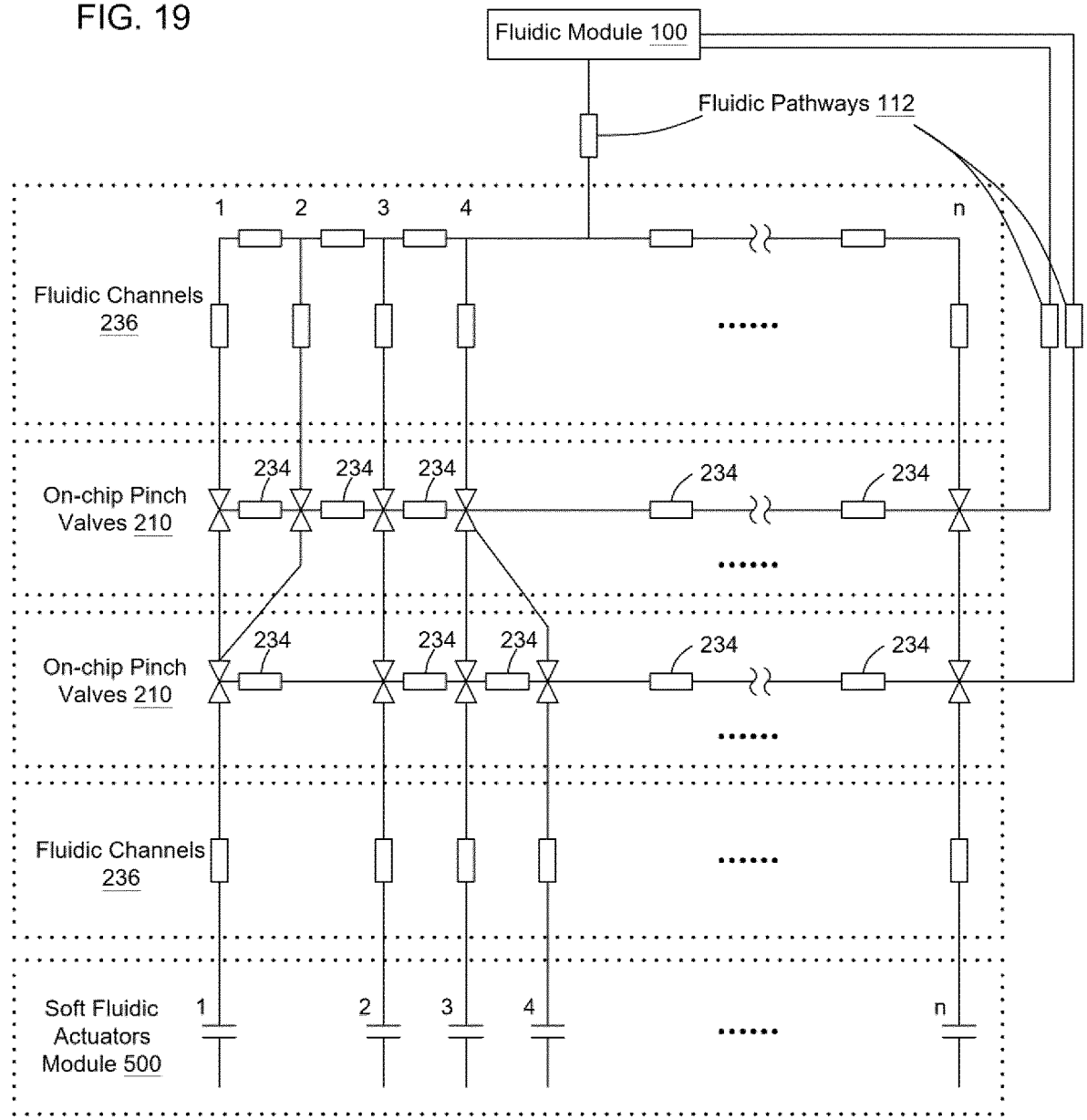

FIG. 19 has 5 sections: two fluidic channels 236 sections and two on-chip pinch valves 210 sections upstream from a soft fluidic actuators module 500 section. An important aspect of this schematic is to show that a plurality of on-chip pinch valves 210 sections may be connected fluidly in series and/or parallel for any embodiments of the present invention. Another important aspect of this schematic is to show that for any embodiments of the present invention, a single and/or a plurality of on-chip pinch valves 210 may fluidly connect to a single and/or a plurality of on-chip pinch valves 210.

Figure 20:
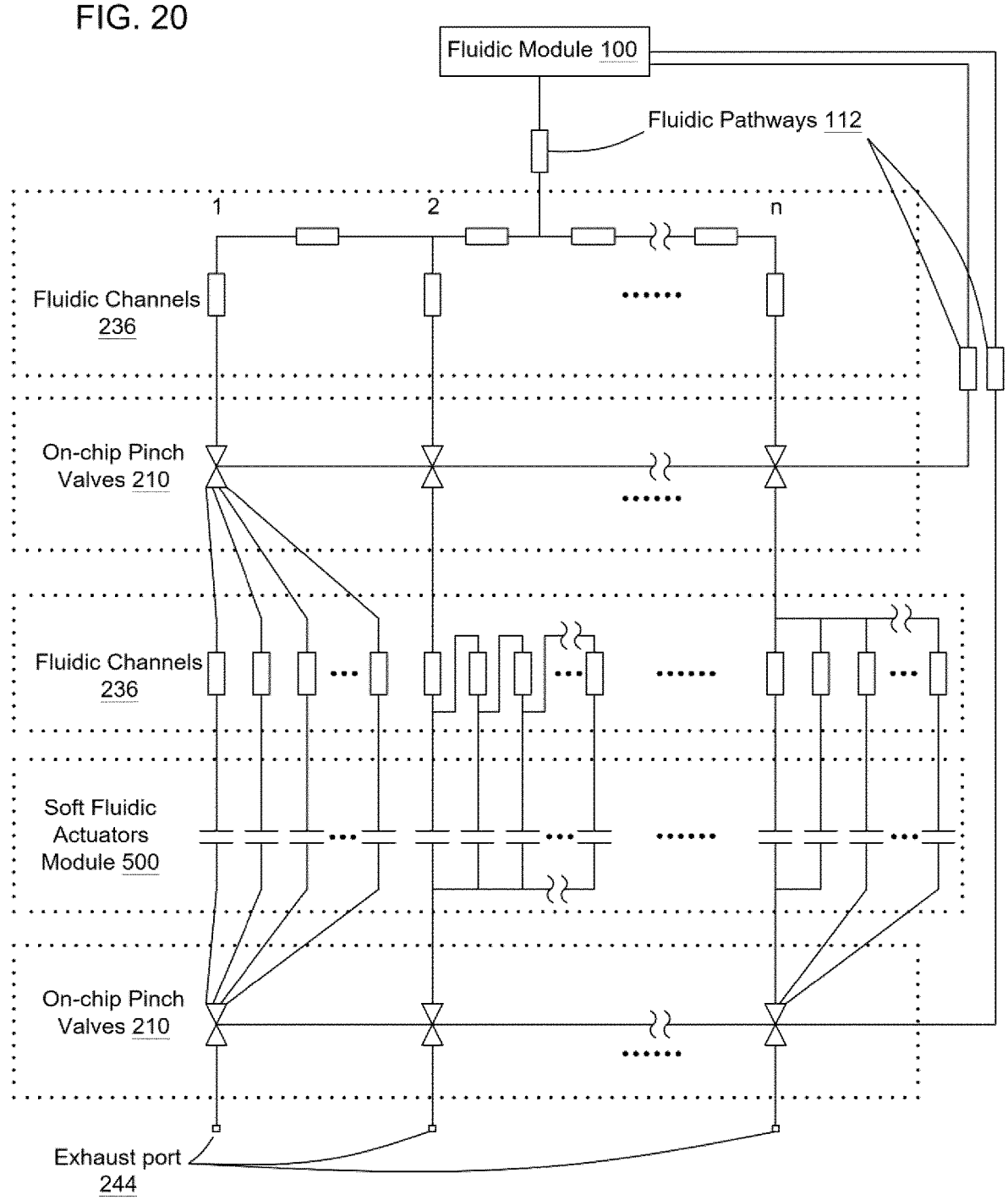

FIG. 20 has 5 sections, two fluidic channels 236 sections, two on-chip pinch valves 210 sections, and a soft fluidic actuators module 500 section. An important aspect of this schematic is to show that for any embodiments of the present invention, a single or plurality of on-chip pinch valves 210 may connect to a single or plurality of fluidic channels 236 connected fluidly in parallel and/or in series leading to a single or a plurality of fluidic capacitors.

Figure 21:
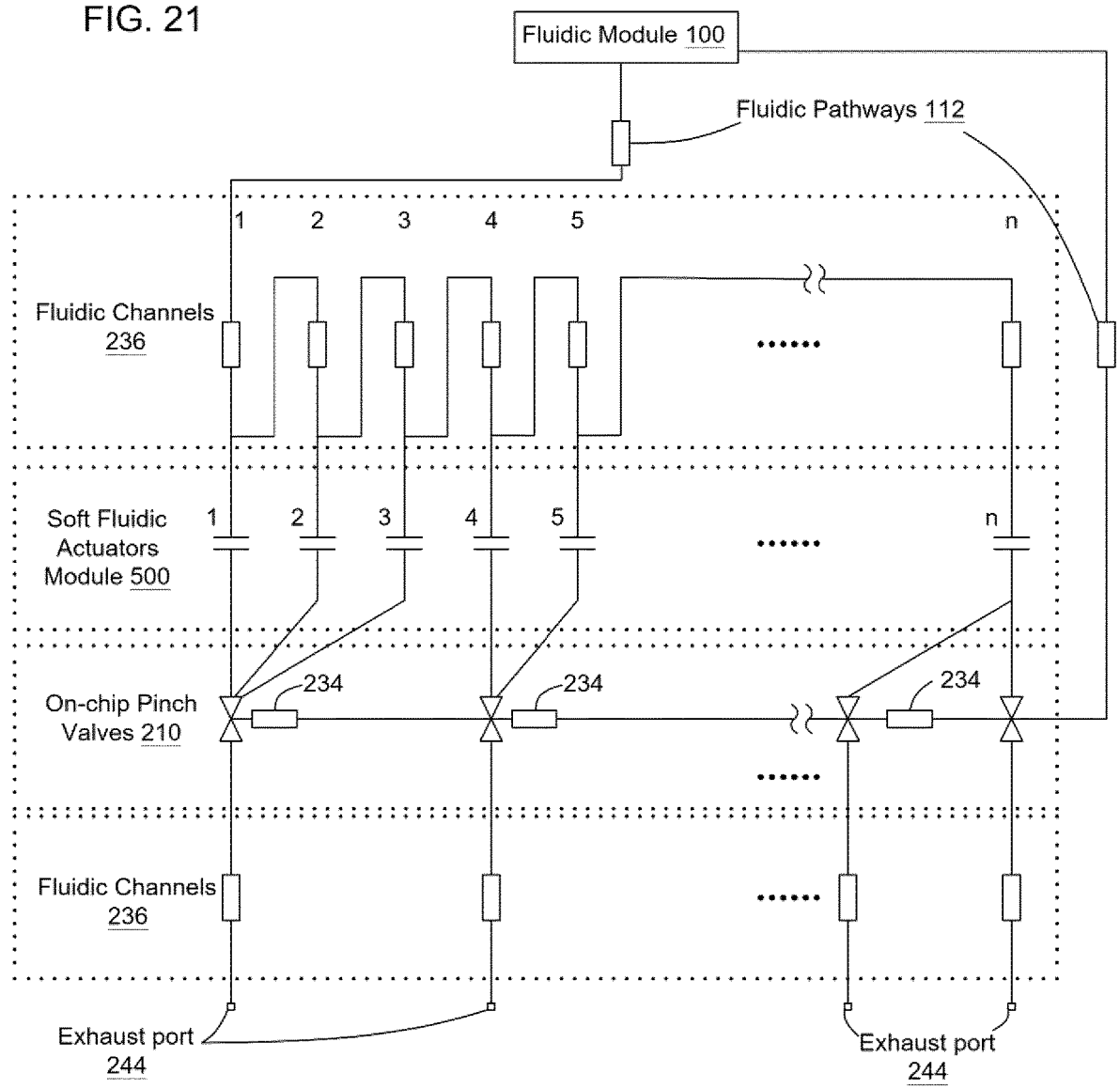

FIG. 21 has four sections: two fluidic channels 236 sections, an on-chip pinch valves 210 section, and a soft fluidic actuators module 500 section. An important aspect of this schematic is to clearly show that for any embodiments of the present invention, any fluidic channels 236 may be connected fluidly in parallel and/or series to a single or a plurality of other fluidic channels 236. Another important aspect of this schematic is to show that for any embodiments of the present invention, a single or a plurality of fluidic capacitors may be fluidly connected to a single or a plurality of on-chip pinch valves.

Figure 22:
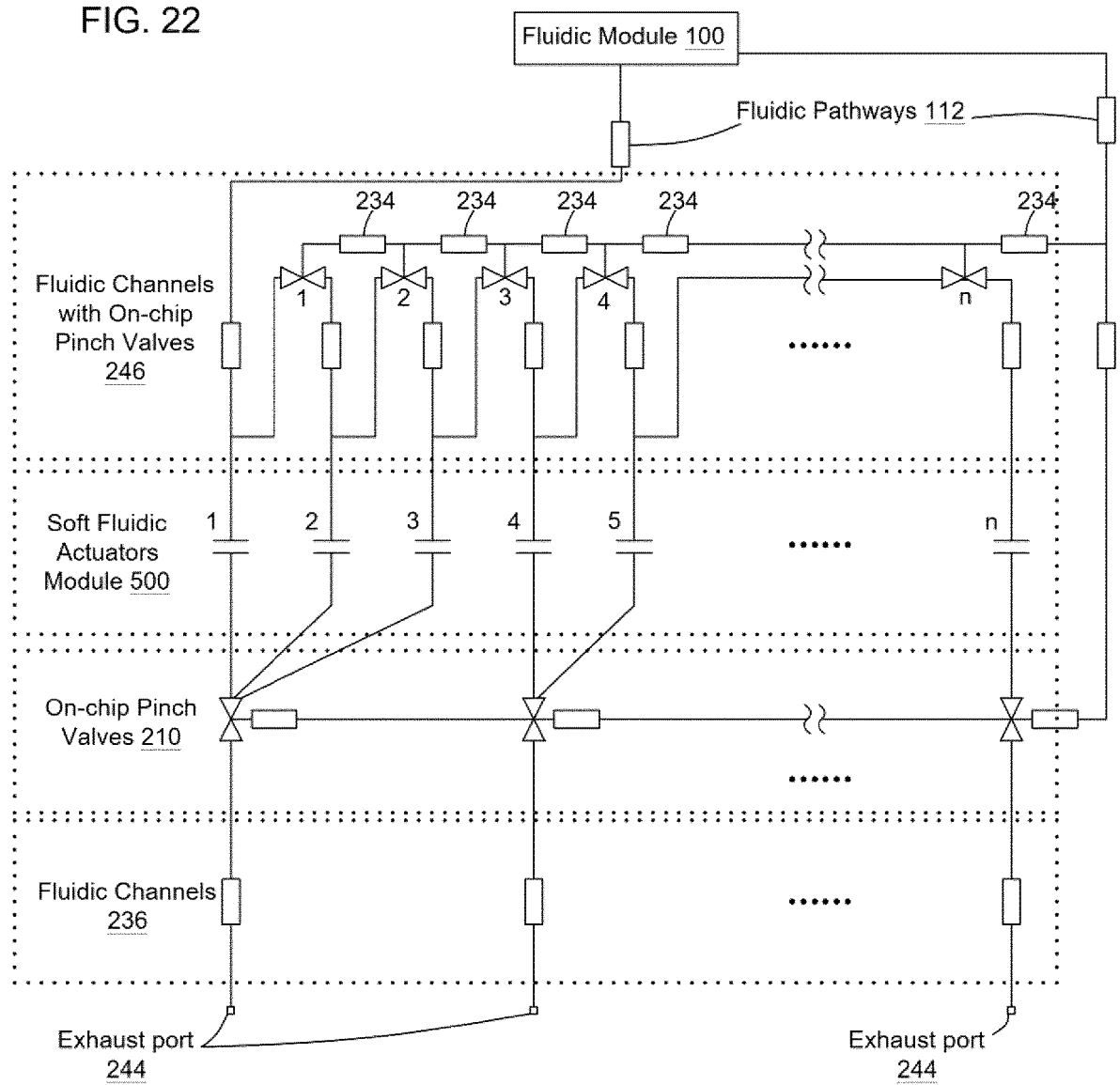

FIG. 22 has four sections: a fluidic channel with on-chip pinch valves 246 section, a soft fluidic actuators module 500 section, an on-chip pinch valves 210 section, and a fluidic channels 236 section. An important aspect of this schematic is to clearly show that for any embodiments of the present invention, a single or a plurality of fluidic channels may be fluidly connected in parallel and/or series to a single or a plurality of on-chip pinch valves.

FIG. 23A is a schematic view of an embodiment of a fluidic chip 202, 204. There are two rows represented by the Roman numeral I and II, and 10 columns of different sized circles represent on-chip pinch valves 210 of different sizes. The 10 columns are represented by the Arabic numeral 1 to 10. The horizontal lines represent at least one fluidic channel 234 connecting to the valve control pressure chambers of at least one on-chip pinch valve 210. The vertical lines represent fluidic channels 236 connecting to the valve pinch chambers of the on-chip pinch valves 210. The fluidic channels 234, 236 may be microfluidic channels and/or minifluidic channels. The fluidic channels 234 may interconnect a single or multiple valve control pressure chambers. The fluidic channels 234 may be an inlet and/or an outlet of the valve pinch chambers, which may be open to the ambient atmosphere or connected to at least one other fluidic channel and/or other components, elements, and/or modules of the invention described herein. The fluidic channels 236 may be an inlet and/or an outlet of at least one valve pinch chamber, which may be open to the ambient atmosphere or connected to at least one other fluidic channel and/or other components, elements, and/or modules of the invention described herein. Different sized on-chip pinch valves allow each valve to partially and/or completely open and/or partially and/or completely close at different pressure imbalance levels between the valve pinch chamber and the valve control pressure chamber, which will be denoted as "closing/opening delta pressures" hereon. Different membrane layer thickness, material properties, fluidic channel connection opening among other things discussed in ii. On-chip Pinch Valve and elsewhere herein may also allow the same-sized valve pinch chambers to have different closing/opening delta pressures. The on-chip pinch valves 210 of row I decreases in closing/opening delta pressures sequentially from left to right, in other words, starting from the left, the row I column 1 on-chip pinch valve 210 has the highest closing/opening delta pressures, the row I column 2 on-chip pinch valve 210 has the second highest closing/opening delta pressures. This decreasing trend continues until row I column 10 on-chip pinch valve 210 which has the lowest closing/opening delta pressures. Row II has the exact opposite trend, where row II column 10 on-chip pinch valve 210 has the highest closing/opening delta pressures, row II column 9 on-chip pinch valve 210 has the second highest closing/opening delta pressures, and row II column 1 on-chip pinch valve 210 has the lowest closing/opening delta pressures. Also, suppose a certain on-chip valve 210 is closed within a row. In that case, all the on-chip valves 210 with closing/opening delta pressures smaller than the certain on-chip valve 210 will also be closed because the valve control pressure chambers of all the on-chip valves 210 on a single row are interconnected. The result of the two row's opposing decreasing sequence of closing/opening delta pressures of the on-chip pinch valves 210 is that any soft fluidic actuators connected to the outlet of the fluidic channels 236 of any column may be individually actuated by closing the on-chip valves 210 of the columns within row I to the right of the column the soft fluidic actuators are connected to and closing the on-chip valves 210 of the columns within row II to the left of the column the soft fluidic actuators are connected to. Although increasing circle diameter corresponds to increasing closing/opening delta pressure as seen in the embodiments depicted in FIG. 23A, FIG. 23B, and FIG. 23C, the opposite (i.e. increasing circle dimeter corresponds to decreasing closing/opening delta pressure) may also be true in certain embodiments of the present invention.

FIG. 23B is a schematic view of an embodiment a fluidic chip 202. This embodiment is similar to the embodiment shown in FIG. 23A except that it has a single row of a plurality of columns of on-chip pinch valves 210 with interconnected valve control pressure chambers by any number of fluid channels 234. The on-chip valves 210 increase in closing/opening delta pressures from column 1 to column 10. If all the on-chip valves 210 are open, permitting fluidic flow through the fluidic channels 236, the on-chip valves 210 may sequentially close from column 1 to column 10 by increasing the pressure within the valve control pressure chamber and/or decreasing the pressure within the valve pinch chamber. If all the on-chip valves 210 are closed, on-chip valves 210 may sequentially open, permitting fluidic flow through the fluidic channels 236 from column 10 to column 1 by decreasing the pressure within the valve control pressure chamber and/or increasing the pressure within the valve pinch chamber. If a series of soft fluidic actuators are connected fluidly to each column, then they may be sequentially inflated and/or deflated to different pressure levels and/or hold those pressure levels.

FIG. 23C is a schematic view of an embodiment of a fluidic chip 202. This embodiment has four rows of on-chip pinch valves 202, where the first two rows are the same as FIG. 23a allowing for sequential and/or individual fluidic flow through the fluidic channels 236. Each fluidic channel downstream from row II diverges into a plurality of fluidic channels of varying fluidic resistance that may allow further sequential and/or gradient fluidic flow into the vertical fluidic channels represented 248 by the squares. The vertical fluidic channels may connect to fluidic components, including but not limited to soft fluidic actuators, fluidic chips, fluidic chip sockets, tubing, and/or fluidic channels. Downstream from the vertical fluidic channels 248 are an additional plurality of fluidic channels connecting to a row of equal-sized on-chip pinch valves 210. When on-chip valves 210 of row III and row I and/or row II are all closed, they may allow the pressure within the fluidic channels between row III and row I/row III to be held. Further downstream from row III is row IV, the size of on-chip valves sequentially increases from column 1 to column 10, that may allow for sequential deflation of fluidic channels from column 10 to column 1. This schematic view also shows that a plurality of fluidic channels may enter a single on-chip pinch valve 210.

FIG. 24A and FIG. 24B shows an embodiment of a microfluidic and minifluidic chip 202 connecting to an embodiment of a microfluidic and minifluidic socket 204. FIG. 25a and FIG. 25b show another embodiment of a microfluidic and minifluidic chip 202 connecting to an embodiment of at least one microfluidic and minifluidic chip socket 204. For both embodiments, please note that the internal fluidic networks and/or on-chip pinch valves within the microfluidic and minifluidic chip 202 and the at least one microfluidic and minifluidic chip sockets 204 are neglected to avoid confusion and more clearly illustrate the connection and/or fluidic communications between the microfluidic and minifluidic chip 202 and the at least one microfluidic and minifluidic chip socket 204. At least one gasket 203 is placed between the microfluidic and minifluidic chip 202 and the microfluidic and minifluidic chip socket 204 to prevent fluidic leakage from at least one fluidic port 250 to at least one other fluidic port 250. The at least one gasket 203 may be made out of any material and it can be any thickness. At least one gasket 203 may be fixed onto the microfluidic and minifluidic chip socket 204 and/or microfluidic and minifluidic chip 202. At least one fluidic port 250 also exist in the gasket 203 to allow fluid to flow through at least one fluidic port 250 on the microfluidic and minifluidic chip 202 to and/or from at least one corresponding fluidic port 250 on the microfluidic and minifluidic chip socket 204. At least one fluidic port 250a as shown in FIG. 24b in the microfluidic and minifluidic chip socket 204 connects at least one fluidic port 250 to at least one fluidic component, including but not limited to tubing, fluidic pathways, fluidic channel pathways, soft fluidic actuators, fluidic capacitors, fluidic modules, fluidic chips, and/or fluidic chip sockets. At least one fluidic port 250, 250a may be a microfluidic channel and/or a minifluidic channel. At least one fluidic port 250, 250a may have any physical characteristics including but not limited to shape, length, route, and/or direction. Certain fluidic ports 250 on the microfluidic and minifluidic chip 202 and/or microfluidic and minifluidic chip socket 204 may not be used and/or connected to any other fluidic ports 250. The connection mechanism 252 to attach microfluidic and minifluidic chip 202 to the f microfluidic and minifluidic chip socket 204 may be but is not limited to mechanical means and/or magnetic means. The mechanical means include but are not limited to squeeze fit, mechanical latch, mechanical fasteners, tapes and/or glue. The magnetic means include but are not limited to using permanent magnets of any shape and/or size, where at least one magnet is on and/or within the microfluidic and minifluidic chip 202, and at least one other magnet is on and/or within the microfluidic and minifluidic chip socket 204. At least one cutout 254 may exist on and/or within at least one gasket that may allow the connection mechanism 252 on the microfluidic and minifluidic chip 202 and the microfluidic and minifluidic chip socket 204 to contact, mate, attach, latch, and/or function.

Any aspects of the embodiments described within iv. Fluidic Network may apply to any microfluidic and minifluidic chips, microfluidic and minifluidic chip sockets and/or fluidic networks of the present invention. It is understood, that certain elements and/or features may be added and/or removed from any embodiments of at least one microfluidic and minifluidic chip, microfluidic and minifluidic chip socket, and/or fluidic network of the present invention in order to produce commercially viable versions of the invention described herein. The microfluidic and minifluidic chips, microfluidic and minifluidic chip sockets, and/or fluidic networks may be manufactured using any fabrication process including but not limited to soft lithography, replica molding, injection molding, additive manufacturing, subtractive manufacturing, 3D printing or any combination thereof. The microfluidic and minifluidic chips, microfluidic and minifluidic chip sockets, and/or fluidic networks may be constructed from any material and/or composite material including but not limited to polydimethylsiloxane (PDMS), plastics, elastomers, silicone, metals, glass, carbon fibers, semiconductors or any combination thereof.

v. Soft Fluidic Actuators and Soft Fluidic Actuators Fabrication Method

FIG. 26A and FIG. 26B shows an embodiment of a soft fluidic actuator and a method of fabricating soft fluidic actuators involving at least one wall layer 510, at least one insert layer 512 and at least one fluidic conduit 514. The at least one wall layer 510 may be elastic, flexible and/or rigid. The at least one insert layer 512 may be elastic, flexible and/or rigid, and it may have at least one surface that does not adhere and/or adhere non-permanently to the at least one wall layer 510. The at least one fluidic conduit 512 transports fluid in and/or out of at least one soft fluidic actuator and/or fluidic capacitor, and it may take the form of including but not limited to at least one fluidic tubing, at least one fluidic pathway and/or at least one fluidic channel. The following are the general processes of fabricating at least one soft fluidic actuator: 1) cut and/or create at least one wall layer 510, 2) cut and/or create at least one insert layer 512, 3) cut and/or create at least one fluidic conduit 514, 4) place the at least one insert layer 512 within the at least one wall layer 510 and/or in between at least two wall layers 510, 5) place at least one fluidic conduit 514 between the inner side of the at least one wall layer 510 and one side of the at least one insert layer 512 that does not adhere and/or adhere non-permanently to the at least one wall layer 510, 6) laminate the assembly made from step (5) with heat and pressure in the direction of the arrows seen in FIG. 26a, 7) as seen in FIG. 26b, connect, bind, bond, fasten, fuse, and/or apply glue and/or apply adhesive material to and/or around the contact surface between the fluidic conduit 514 and the at least one wall layer 510 to seal at least one gap 516, 8) let the glue and/or adhesive material cure and integrate the finished soft fluidic actuator with other components to complete the soft robot. The at least one wall layer 510 must always be larger than the insert layers 512 to ensure a seam of bonded wall layer 518 surround the insert layers 512. Each wall layer 510 must be capable of bonding to itself and/or at least one other wall layer 510 via heat and/or pressure. If a plurality of wall layers 510 exist, they may be of the same or different materials. The wall layers 510 and/or the insert layers 512 may be made up of monolithic material and/or composite material. The insert layers 512 may be left inside the soft fluidic actuator or removed via an opening and then seal the opening.

FIG. 27A and FIG. 27B shows another embodiment of a soft fluidic actuator and a variation of the method of fabricating soft fluidic actuators involving at least one wall layer 510, and at least one insert layer 512. The shape of the soft fluidic actuator is changed from FIG. 26 to showcase that the soft fluidic actuators of the present invention and/or created via methods of the present invention may be of any shape, size and/or volume. The separate fluidic conduit 514 from FIG. 26 is replaced by an integrated fluidic conduit 520 that is part of the soft fluidic actuator. An extension section 522 from the at least one insert layer and extension section 524 from the at least one wall layer when laminated together creates the integrated fluidic conduit 520. The wall extension 522 surrounds the insert extension on all sides except one, leaving an opening 526, which may be connected to fluidic components including but not limited to fluidic tubing, fluidic pathways, fluidic chip, fluidic chip sockets and/or fluidic module. The arrows in FIG. 27A represents the directions to apply heat and pressure to laminate the layers. Please note that heat and/or pressure may be replaced by any other type of energy including but not limited to vibration, friction, chemical, mechanical, radiation, ultrasonic, electrical, or any combination thereof.

FIG. 28, FIG. 29, and FIG. 30 are cross-sectional schematic exploded assembly views of various embodiments of soft fluidic actuators. FIG. 28 shows an embodiment with at least two wall layers 510, at least one insert layer 512 in between the at least two wall layers 510 and at least one fluidic conduit in between the at least one insert layer 512 and at least one wall layer 510. Since the at least one insert layer 512 does not adhere and/or adhere non-permanently to the at least one wall layer 510, it creates at least one fluidic chamber and/or fluidic capacitor when fluidly pressurized. The embodiment shown by FIG. 29 differs from the embodiment shown by FIG. 28 in that the at least one insert layer is a composite comprising of a side 512 which does not adhere and/or adhere non-permanently to the at least one wall layer 510, and another side 512a that adheres and/or bonds to the at least one wall layer 510. FIG. 30 shows an embodiment where at least one additional backing layer 528 is applied to the outside of the at least one wall layer 510. The at least one backing layer 528 include but is not limited to fabrics, sensors modules, membranes, electrical transmission system, flexible and/or rigid components of the soft robot. The backing layer 528 may be bonded completely, bonded partially, and/or not bonded to the at least one soft fluidic actuator. Soft fluidic actuators may take on any physical characteristics including but not limited to shape, volume, size, wall thickness, material property, and/or internal fluidic chamber structure.

FIG. 31 and FIG. 32 are two embodiments of a plurality of overlaying and/or overlapping soft fluidic actuators that may be created via the method described herein. FIG. 31A to FIG. 31C shows an embodiment of a plurality of overlapping independent soft fluidic actuators that may provide compression 502. Each independent soft fluidic actuator has at least one wall layer 510 and at least one insert layer 512, which together forms at least one soft fluidic actuator chamber 530 for each soft fluidic actuator. Each soft fluidic actuator has at least one fluidic conduit 514, which fluidly communicates with at least one soft fluidic actuator chamber 530 for inflation and/or deflation of at least one soft fluidic actuator 502. Depending on the location and/or percentage of the at least one bonded wall portion 531 and/or the shape and/or volume of each soft fluidic actuator chamber 530, the overlay portion may provide varying levels of compression profile, force, deformation, or any combination thereof. At least one permanent and/or non-permanent backing layer may be applied to the at least one soft fluidic actuator and/or a portion of the at least one soft fluidic actuator.

FIG. 32A to FIG. 32C shows an embodiment of a plurality of overlapping interconnected soft fluidic actuators for providing torque, motion, force, and/or compression, which may generally be categorized as bellow/accordion-shaped soft fluidic actuators. Each soft fluidic actuator has at least one wall layer 510 and at least one insert layer 512, which may together form at least one soft fluidic actuator chamber 530 for each soft fluidic actuator. Each soft fluidic actuator has at least one fluidic conduit 514, which directly fluidly communicates with at least one other soft fluidic actuator's chamber 530 for inflation and/or deflation of the at least one soft fluidic actuator. Depending on the location and/or percentage of the at least one bonded wall portions 531 and/or the shape and/or volume of each soft fluidic actuator chamber 530, the bellow/accordion-shaped soft fluidic actuators may produce a varying level of compression, deformation, force, torque, bending motion, linear motion, or any combination thereof. A permanent and/or non-permanent backing layer may be applied to at least one soft fluidic actuator and/or a portion of the at least one soft fluidic actuator.

Please note that at least one fluidic conduit 514 and/or integrated fluidic conduit 520 may be replaced by at least one additional insert layer that does not adhere and/or adhere non-permanently to the wall layer 510 during the heat and pressure bonding process. The at least one additional insert layer may be removed later and replaced by at least one fluidic conduit 512 and/or integrated fluidic conduit 514. During the fabrication process, any tools including but not limited to machines, fixtures, jigs, tapes, glues, molds, non-stick films and/or templates may be used. Certain soft fluidic actuator fabrication steps may be switched in order and/or added and/or subtracted without deviating from the invention described herein. In certain embodiments of the invention described herein, heat and pressure bonding may be replaced with any other bonding method including but not limited to plasma bonding, friction-stir bonding, welding, soldering, optical bonding methods, magnetic bonding methods, electrical bonding methods, or any combination thereof without deviating from the invention described herein.

vi. Examples of a Soft Robotic System

Examples of microfluidic valves and channels and minifluidic valves and channels enabled soft robotic systems include but are not limited to active compression apparel, dynamic prostheses sockets, sleeves, braces, prosthetic hands and fingers, rehabilitation gloves, dynamic hip protectors, dynamic cushions, wearable assistive devices, wearable haptics devices, tactile devices and/or wearable virtual reality/augmented reality devices. Any aspects of the embodiment shown may be applied to any soft robotic system without deviating from the invention described herein.

FIG. 33A and FIG. 33B show an embodiment of active compression apparel, which is an example of a soft robotic system 000 enabled by the invention described herein. The active compression apparel may be worn on any limb 532 of the human body and/or surrounds and applies active compression to the skin 534 and/or the limb 532. The active compression sleeve comprises at least one control box 010, at least one microfluidic and/or minifluidic valves and channels module 200, one or a plurality of compression force sensors 402 and/or any sensor from the sensors module integrated with at least one layer of the active compression sleeve, one or a plurality of soft fluidic actuators for providing compressions 502, at least one skin contact backing layer 528a for the at least one soft fluidic actuators 502, at least one strain-limiting backing layer 528b for the at least one soft fluidic actuator 502, one or a plurality of fluidic conduits 514 fluidly connecting the one or a plurality of soft fluidic actuators 502 with the at least one microfluidic and/or minifluidic valves and channels module 200, and one or a plurality of fluidic pathways connecting the at least one microfluidic and/or minifluidic valves and channels module 200 with the at least one control box 010.

The at least one control box 010 further comprises at least one fluidic module 100, at least one control center module 300, and at least one electrical power module 600. The at least one control box 010 and/or any of its contained modules and/or components may be integrated with the soft robot in selectively removable relation. The at least one control box 010 may be elastic, flexible, rigid or any combination thereof. The at least one fluidic module 100 supplies one or a plurality of fluidic flow to and/or from the at least one microfluidic and/or minifluidic valves and channels module 200. The at least one control center module controls 300 the at least one fluidic module 100 and receives at least one electrical signal from one or a plurality of compression force sensors 402 and/or any sensor from the sensors module. The at least one control center 300 contains electronic hardware and software for processing and/or converting the electrical signals from the one or a plurality of compression force sensors 402 and/or any sensor from the sensors module for controlling the at least one fluidic module 100. The at least one control center module 300 communicates with one or a plurality of compression force sensors 402 and/or any sensor from the sensors module via physical and/or wireless signal transmission methods. The at least one control center module 300 may also communicate via physical and/or wireless communications method(s) with at least one external device for user control and/or displaying information to user(s). The at least one control center module 300 may comprise one or more software components that, at least partially, are operatively executed and/or reside on the portable computing device. The at least one electrical power module 600 may supply the at least one fluidic module 100 and the at least one control center module 300 with electrical power. The at least one electrical power module 600 may also supply one or a plurality of compression force sensors 402 and/or any sensor from the sensors module with electrical power. The at least one microfluidic and/or minifluidic valves and channels module 200 allow for any type, pattern, and/or sequence of inflation and/or deflation of one or a plurality of soft fluidic actuators 502. There may be one or multiple microfluidic and/or minifluidic valves and channels modules 200, which may be fluidly connected with each other and/or control box 010. Each MMVC module may be fluidly connected to one or a plurality of soft fluidic actuators 502.

The at least one control box 010 may have physical buttons and/or electronic displays and/or touchscreens for user interaction. The at least one skin contact backing layer 528a may be constructed out of garment for user comfort. The at least one strain-limiting backing layer 528b may be constructed out of layers of garment, leather, elastomer films, flexible film, plastic films and/or rigid components to direct the compression towards the skin 534 and limit the volume expansion of the at least one soft fluidic actuator 502. The at least two soft fluidic actuators 502 may overlap each other by any amount and/or percentage. Certain soft fluidic actuators 502 may directly fluidly communicate with one or a plurality of other soft fluidic actuators 502.

FIG. 34 shows an embodiment of a soft robotic system. In this embodiment (FIG. 34), a control box fluidly connects one or a plurality of MMVC modules 200 in fluidic series and/or parallel via one or a plurality of fluidic pathways 112 and/or one or a plurality of fluidic channel pathways 206. Each MMVC module 200 may fluidly connect to one or a plurality of fluidic capacitor 242 in fluidic series and/or parallel via one or a plurality of soft fluidic actuator fluidic conduits 514. Any number and type of fluidic components including but not limited to valves, pumps, filters, reservoirs, pressure sensors, flow sensors, fluidic silence/muffler or any combination thereof may exist in the one or a plurality of fluidic pathways 112 and/or one or a plurality of fluidic channel pathways 206 in between each MMVC module 200. Any number and type of fluidic components including but not limited to valves, pumps, filters, reservoirs, pressure sensors, flow sensors, fluidic silence/muffler or any combination thereof may exist in the at least one soft fluidic actuator fluidic conduits 514 in between each MMVC module 200 and one or a plurality of fluidic capacitors 242.

It must be noted that certain embodiments may have all of the elements described here, whereas certain other embodiments may have only part of the elements described herein. A person skilled in the art can faithfully reproduce any of the embodiments of the invention described herein.

The invention is contemplated for use in association with microfluidics valves and channels and/or minifluidic valves and channels enabled soft robotic devices, apparel, and methods to afford increased advantageous utilities in association with same. The invention, however, is not so limited and can be readily used with other items to afford various advantageous utilities within the scope of the invention. Other embodiments, which fall within the scope of the invention, may be provided.

The foregoing description has been presented for the purpose of illustration and is not intended to be exhaustive or to limit the invention to the precise form disclosed.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

The indefinite articles "a" and "an," as used herein in the specification and in the claims, unless clearly indicated to the contrary, should be understood to mean "at least one".

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of", or when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of". "Consisting essentially of", when used in the claims, shall have its ordinary meaning as used in the field of patent law.

The computing elements or functions disclosed herein may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention.

Other modifications and alterations may be used in the design, manufacture, and/or implementation of other embodiments according to the present invention without departing from the spirit and scope of the invention, which is limited only by the claims of this patent application and any divisional and/or continuation applications stemming from this patent application.

The invention claimed is:

1. A microfluidics valves and channels and minifluidic valves and channels enabled device, for use with one or more soft robotic devices, the device comprising:
    (a) one or more soft fluidic actuators operable to apply one or more predetermined compression, forces, torque, and/or motion to one or more surfaces and/or objects;
    (b) one or more microfluidic and minifluidic valves and channels module comprising one or more small-scale fluidic channels and one or more on-chip fluidic pressure-controlled pinch valves forming a fluidic network; wherein the small-scale fluidic channels comprise fluidic micro channels and/or fluidic mini channels; wherein the on-chip fluidic pressure-controlled pinch valves each respectively comprises a valve pinch chamber, a membrane layer, and a valve control pressure chamber;
    (c) a fluidic module in fluid communications via the small-scale fluidic channels and/or on-chip fluidic pressure-controlled pinch valves with the soft fluidic actuators; wherein the fluidic module is operable to induce flow of fluid under pressure, through one or more small-scale fluidic channels and/or valve pinch chambers of one or more on-chip fluidic pressure-controlled pinch valves, to one or more soft fluidic actuators, wherein the fluidic module is operable to induce flow of fluid under pressure, through one or more small-scale fluidic channels, to the valve control pressure chamber of one or more on-chip fluidic pressure-controlled pinch valves to close and/or open one or more on-chip fluidic pressure-controlled pinch valves fully and/or partially;
    (d) one or more sensors operable to generate signals based on biometrics, motions, orientation, forces and/or torques of the device or a user of the device; and
    (e) a control module connected to receive the signals from the one or more sensors and operable selectively, depending upon the signals received from the one or more sensors, to operate the fluidic module to induce flow of fluid under pressure to and from one or more microfluidic and minifluidic valves and channels module and/or one or more soft fluidic actuators.

2. The device according to claim 1, wherein, for each of the on-chip fluidic pressure-controlled pinch valves, the membrane layer separates and prevent direct fluidic communication between the valve control pressure chamber and the valve pinch chamber; and wherein one or more small-scale fluidic channels fluidly connects to the valve control pressure chamber and valve pinch chamber.

3. The device according to claim 2, wherein one or more small-scale fluidic channels have different cross-sectional areas, cross-sectional shapes, channel lengths, channel characteristic dimension, and/or channel routes causing different amounts of fluidic resistance.

4. The device according to claim 1, wherein each on-chip fluidic pressure-controlled pinch valve is operable, when a fluidic pressure imbalance exists between the valve control pressure chamber and the valve pinch chamber and/or valve fluidic flow side, to deflect a freestanding portion of the membrane layer into the valve pinch chamber to fully or partially stop fluid flow from one or more small-scale fluidic channels through the valve pinch chamber to one or more other small-scale fluidic channels.

5. The device according to any claim 1, wherein, for the one or more on-chip fluidic pressure-controlled pinch valves, the respective valve control pressure chambers and the valve pinch chambers have different volumes, shapes, sizes, and/or dimensions.

6. The device according to claim 1, wherein, for the one or more on-chip fluidic pressure-controlled pinch valves, the respective membrane layers have different material properties and/or thicknesses.

7. The device according to claim 1, wherein a single one of the valve control pressure chambers is operative to deflect the membrane layer for one or more of the valve pinch chambers.

8. The device according to claim 1, wherein the small-scale fluidic channels and the on-chip fluidic pressure-controlled pinch valves are configured to be fluidly connected in series and/or parallel forming the fluidic network; and wherein the fluidic network comprises at least one small-scale fluidic channel and at least one on-chip fluidic pressure-controlled pinch valve; and wherein the fluidic network fluidly communicates with one or a plurality of the soft fluidic actuators.

9. The device according to claim 1, wherein the fluidic network is configured to use different closing/opening delta pressure of a plurality of on-chip fluidic pressure-controlled pinch valve combined with different fluidic resistance of a plurality of small-scale fluidic channels to sequentially, uniformly, selectively, and/or independently control the flow to and from the plurality of soft fluidic actuators.

10. The device according to claim 1, further comprising one or more control boxes that at least partially contain the fluidic module, the control module, the microfluidic and minifluidic valves and channels module, and/or the sensors.

11. The device according to claim 1, further comprising at least one electrical power module operable to electrically power the fluidic module, the control module, and/or the sensors.

12. The device according to claim 1, wherein the one or more sensors are integrated with an elastic, flexible and/or rigid portion of the device.

13. The device according to claim 1, wherein for a plurality of the soft fluid actuators, corresponding multiple interconnected and/or independent soft fluidic actuator chambers are overlaid and/or stacked with an outer surface of a wall layer of each soft fluidic actuator chamber bonded at selective locations to a wall layer of at least one other soft fluidic actuator chamber at selective locations to form bonded wall portions.

14. The device according to claim 13, wherein the plurality of the soft fluid actuators are bellow/accordion-shaped soft fluidic actuators operable to provide force, torque, compression, bending motion, linear motion or any combination thereof based on the selective locations and/or percentages of the bonded wall portions and/or shapes and/or volumes of the corresponding soft fluidic actuator chambers.

15. The device according to claim 13, wherein the plurality of the soft fluidic actuators are operable to provide compression based on the selective locations and/or percentages of the bonded wall portions and/or shapes and/or volumes of each soft fluidic actuator chamber.

16. A soft robotic device comprising the device according to claim 1.

17. An active compression apparel comprising the device according to claim 1, operable to be worn on a limb of a human body and/or surround and apply active compression to skin and/or the limb of the human body.

18. The active compression apparel according to claim 17, further comprising at least one skin contact backing layer and at least one strain-limiting backing layer sandwiching the one or more soft fluidic actuators, wherein the one or more soft fluidic actuators are operable selectively to provide compression to the skin and/or the limb of the human body through the at least one skin contact backing layer.

19. The active compression apparel according to claim 18, wherein the one or more sensors comprise one or more compression force sensors disposed adjacent corresponding ones of the one or more soft fluidic actuators such that each compression force sensor is sandwiched between the corresponding soft fluidic actuator and the skin and/or limb when worn on the limb of the human body.

20. The active compression apparel according to claim 17, wherein the active compression apparel is an active compression sleeve.

* * * * *